(12) United States Patent
Murayama et al.

(10) Patent No.: US 11,629,810 B2
(45) Date of Patent: Apr. 18, 2023

(54) TILTING DEVICE

(71) Applicant: FUNAI ELECTRIC CO., LTD., Osaka (JP)

(72) Inventors: Manabu Murayama, Osaka (JP); Naoyuki Wakabayashi, Osaka (JP); Shingo Hamada, Osaka (JP)

(73) Assignee: FUNAI ELECTRIC CO., LTD., Osaka (JP)

(*) Notice: Subject to any disclaimer, the term of this patent is extended or adjusted under 35 U.S.C. 154(b) by 0 days.

(21) Appl. No.: 17/472,719

(22) Filed: Sep. 13, 2021

(65) Prior Publication Data
US 2022/0082202 A1 Mar. 17, 2022

(30) Foreign Application Priority Data
Sep. 17, 2020 (JP) .............................. JP2020-156234

(51) Int. Cl.
*F16M 11/10* (2006.01)
*F16M 11/18* (2006.01)
*G05B 13/02* (2006.01)
(52) U.S. Cl.
CPC ............. *F16M 11/10* (2013.01); *F16M 11/18* (2013.01); *G05B 13/024* (2013.01)
(58) Field of Classification Search
CPC .... F16M 11/10; F16M 11/18; F16M 11/2021; G05B 13/024
USPC ........................................................ 248/550
See application file for complete search history.

(56) References Cited

U.S. PATENT DOCUMENTS

| | | | | |
|---|---|---|---|---|
| 3,733,758 A * | 5/1973 | Maier | ................... | B64G 1/443 244/172.6 |
| 4,030,102 A * | 6/1977 | Kaplan | ................ | H01Q 15/161 244/172.6 |
| 4,155,524 A * | 5/1979 | Marello | ................. | B64G 1/443 244/172.6 |
| 5,833,176 A * | 11/1998 | Rubin | .................... | B64G 1/222 244/172.7 |
| 6,343,442 B1 * | 2/2002 | Marks | .................... | B64G 1/222 244/172.6 |
| 9,444,394 B1 * | 9/2016 | Thomas | .................. | H02S 20/30 |
| 2010/0269446 A1 * | 10/2010 | Merrifield | ............. | E01D 15/124 52/646 |
| 2018/0007803 A1 * | 1/2018 | Giuseppe | .............. | G06F 1/1601 |

(Continued)

FOREIGN PATENT DOCUMENTS

| | | |
|---|---|---|
| FR | 2883065 | 9/2006 |
| JP | 2005058387 | 3/2005 |

*Primary Examiner* — Muhammad Ijaz
(74) *Attorney, Agent, or Firm* — JCIPRNET

(57) ABSTRACT

A tilting device includes: an upper movable plate arranged on a side on which an object T to be tilted is arranged; an intermediate movable plate connected to the upper movable plate in a rotatable manner via an upper rotation shaft; a first actuator; a first lower movable plate connected to the intermediate movable plate in a rotatable manner via a first lower rotation shaft; a second actuator; and a first connecting member that is connected to the upper movable plate in a rotatable manner via a first connecting rotation shaft at an end portion on a side of a first direction, and that is connected to the first lower movable plate in a rotatable manner via a second connecting rotation shaft at an end portion on a side of a second direction opposite to the first direction.

10 Claims, 19 Drawing Sheets

(56) References Cited

U.S. PATENT DOCUMENTS

| 2021/0207764 | A1* | 7/2021 | Kuo | F16M 11/2021 |
| 2021/0304642 | A1* | 9/2021 | Lee | G06F 1/1681 |
| 2022/0082202 | A1* | 3/2022 | Murayama | G05B 13/024 |

* cited by examiner (A) start of expansion of the first expansion/contraction bag continued expansion of the first expansion/contraction bag (B) momentum in unintended direction is generated in the first movable plate continued expansion of the first expansion/contraction bag (B) the first movable plate is tilted in unintended direction (A) start of expansion of the first expansion/contraction bag continued expansion of the first expansion/contraction bag (B) tilt angle of the first movable plate increases continued expansion of the first expansion/contraction bag (C) the first movable plate is tilted to predetermined tilt angle

TILTING DEVICE

CROSS-REFERENCE TO RELATED APPLICATION

This application claims the priority benefit of Japan application serial no. 2020-156234, filed on Sep. 17, 2020. The entirety of the above-mentioned patent application is hereby incorporated by reference herein and made a part of this specification.

BACKGROUND

Technical Field

The disclosure relates to a tilting device, and more particularly to a tilting device that tilts a person or an object.

Related Art

Conventionally, a tilting device for tilting a person or an object has been known (for example, see Patent literature 1: Japanese Patent Laid-Open No. 2005-058387).

In Patent literature 1, a tilting device is disclosed which includes a substrate, two pillow air bags mounted on the substrate, a support plate supported on the upper surface of the two pillow air bags, and a link mechanism that allows the support plate to be tilted with respect to the substrate. The tilting device disclosed in Patent literature 1 is configured to tilt the support plate by lifting an end portion of the support plate by an expanded pillow air bag when one of the two pillow air bags is expanded. In addition, the link mechanism rotates the support plate around an end portion on one side of the support plate, thereby holding the support plate in a manner that the support plate can be tilted to one side, and the link mechanism also rotates the support plate around an end portion on the other side of the support plate, thereby holding the support plate in a manner that the support plate can be tilted to the other side. That is, the tilting device disclosed in Patent literature 1 is configured to be capable of changing a direction in which the support plate is tilted according to the pillow air bag to be expanded.

However, in the tilting device of Patent literature 1, the link mechanism rotates the support plate (movable plate) around the end portion on one side of the movable plate, thereby holding the movable plate in a manner that the movable plate can be tilted to one side, and the link mechanism also rotates the movable plate around the end portion on the other side of the movable plate, thereby holding the movable plate in a manner that the movable plate can be tilted to the other side. Therefore, there is a problem that when an object to be tilted is arranged at the end portion opposite to the end portion which is a rotation shaft when the movable plate is tilted, a momentum in an unintended direction opposite to the tilting direction is generated in the movable plate due to the own weight of the object to be tilted, and the movable plate may be tilted in the unintended direction.

The disclosure provides a tilting device that can suppress tilting of a movable plate in an unintended direction due to arrangement of an object to be tilted when the tilting device is tilted.

SUMMARY

A tilting device according to one aspect of the disclosure includes: an upper movable plate arranged on a side on which an object to be tilted is arranged; an intermediate movable plate arranged below the upper movable plate and connected to the upper movable plate in a rotatable manner via an upper rotation shaft; a first actuator arranged between the upper movable plate and the intermediate movable plate; a first lower movable plate arranged below the intermediate movable plate and connected to the intermediate movable plate in a rotatable manner via a first lower rotation shaft; a second actuator arranged between the intermediate movable plate and the first lower movable plate; and a first connecting member that is connected to the upper movable plate in a rotatable manner via a first connecting rotation shaft at an end portion on a side of a first direction opposite to an end portion at which the upper movable plate is connected to the intermediate movable plate, and that is connected to the first lower movable plate in a rotatable manner via a second connecting rotation shaft at an end portion on a side of a second direction opposite to the first direction.

The tilting device according to one aspect of the disclosure further includes, in a configuration in which the upper movable plate, the intermediate movable plate, and the first lower movable plate are arranged from the top to the bottom, a first connecting member that is connected to the upper movable plate in a rotatable manner via the first connecting rotation shaft and connected to the first lower movable plate in a rotatable manner via the second connecting rotation shaft. Here, when the upper movable plate is rotated around the axis of the upper rotation shaft of the upper movable plate and the intermediate movable plate, the first connecting member rotates integrally with the upper movable plate around the axis of the second connecting rotation shaft of the first connecting member and the first lower movable plate. Therefore, the first connecting member is configured to be connected to the upper movable plate via the first connecting rotation shaft. Accordingly, when the upper movable plate is tilted by rotating the upper movable plate in a rotation direction around the upper rotation shaft, the movement of the upper rotation shaft of the upper movable plate can be restricted by the first connecting member that is connected to the upper movable plate via the first connecting rotation shaft even in a case that the object to be tilted is arranged at an end portion opposite to the upper rotation shaft. Consequently, occurrence of a momentum in an unintended direction in the upper movable plate due to the own weight of the object to be tilted can be suppressed, and thus it is possible to provide a tilting device that can suppress tilting of a movable plate in an unintended direction due to arrangement of an object to be tilted when the tilting device is tilted.

In the tilting device according to the above aspect, the first connecting rotation shaft of the first connecting member and the upper movable plate is arranged substantially coaxially with the first lower rotation shaft of the intermediate movable plate and the first lower movable plate, and the second connecting rotation shaft of the first connecting member and the first lower movable plate is arranged substantially coaxially with the upper rotation shaft of the upper movable plate and the intermediate movable plate. Here, when the intermediate movable plate is rotated around the axis of the first lower rotation shaft of the intermediate movable plate and the first lower movable plate, the upper movable plate rotates integrally with the intermediate movable plate around the axis of the first connecting rotation shaft of the first connecting member and the upper movable plate. In this case, if the first lower rotation shaft is not arranged substantially coaxially with the first connecting rotation shaft, a deviation occurs between the rotation center of the upper movable plate and the rotation center of the intermediate movable plate. If a deviation occurs between the rotation center of the upper movable plate and the rotation center of the intermediate movable plate, the upper movable plate cannot rotate integrally with the intermediate movable plate.

In addition, when the upper movable plate is rotated around the axis of the upper rotation shaft of the upper movable plate and the intermediate movable plate, a deviation occurs between the rotation center of the upper movable plate and the rotation center of the first connecting member if the upper rotation shaft is not arranged substantially coaxially with the second connecting rotation shaft. If a deviation occurs between the rotation center of the upper movable plate and the rotation center of the first connecting member, the upper movable plate cannot rotate integrally with the first connecting member.

Therefore, if the first connecting rotation shaft is arranged substantially coaxially with the first lower rotation shaft as described above, generation of a deviation between the first connecting rotation shaft and the first lower rotation shaft can be suppressed. Consequently, when the intermediate movable plate is rotated around the axis of the first lower rotation shaft, the intermediate movable plate can be suppressed from being unable to rotate. In addition, if the upper rotation shaft is arranged substantially coaxially with the second connecting rotation shaft, generation of a deviation between the upper rotation shaft and the second connecting rotation shaft can be suppressed. Consequently, when the upper movable plate is rotated around the axis of the first rotation shaft, the upper movable plate can be suppressed from being unable to rotate.

In this case, the first connecting member has a rod-like shape and is configured to extend in a direction intersecting the upper rotation shaft and the first lower rotation shaft in a plan view. With this configuration, the first connecting member is configured to extend in the direction intersecting the upper rotation shaft and the first lower rotation shaft, and thus it is possible to suppress the first connecting member from interfering with the rotation of the upper movable plate when the upper movable plate rotates around the upper rotation shaft, and also it is possible to suppress the first connecting member from interfering with the rotation of the intermediate movable plate when the intermediate movable plate rotates around the first lower rotation shaft.

In the configuration in which the first connecting rotation shaft is arranged substantially coaxially with the first lower rotation shaft, and the second connecting rotation shaft is arranged substantially coaxially with the upper rotation shaft, the first connecting member is arranged at an end portion of the upper movable plate and an end portion of the first lower movable plate in a third direction which is on one side of a direction orthogonal to the first direction and the second direction in a plan view. With this configuration, the first connecting member can be arranged outside the upper rotation shaft and the first lower rotation shaft in the third direction. Consequently, as compared with a configuration in which the first connecting member is arranged inside the upper rotation shaft and the first lower rotation shaft in the third direction, the intermediate movable plate does not need to be provided with an opening or the like for passing the first connecting member, so that complication of the configuration of the device can be suppressed.

In this case, a length of the upper movable plate in a direction along the upper rotation shaft is larger than a length of the intermediate movable plate in a direction along the upper rotation shaft, and a length of the first lower movable plate in a direction along the first lower rotation shaft is larger than a length of the intermediate movable plate in a direction along the first lower rotation shaft. The first connecting rotation shaft is arranged on an end portion side of the upper movable plate and more outward than the first lower rotation shaft in the third direction, and the second connecting rotation shaft is arranged on an end portion side of the first lower movable plate and more outward than the upper rotation shaft in the third direction. With this configuration, it is possible to suppress the first connecting member from being arranged outside the upper movable plate and the first lower movable plate in a plan view even if the first connecting member is arranged outside the upper rotation shaft and the first lower rotation shaft. Consequently, an increase in the size of the device can be suppressed.

The tilting device further includes, in the configuration in which the first connecting rotation shaft is arranged more outward than the first lower rotation shaft and the second connecting rotation shaft is arranged more outward than the upper rotation shaft, a first protrusion of the upper movable plate, which is arranged more outward than the first lower rotation shaft in the third direction and protrudes downward from the upper movable plate toward the first lower movable plate; and a second protrusion of the first lower movable plate, which is arranged more outward than the upper rotation shaft in the third direction and protrudes upward from the first lower movable plate toward the upper movable plate. The first connecting rotation shaft is arranged at an end portion on the lower side of the first protrusion, and the second connecting rotation shaft is arranged at an end portion on the upper side of the second protrusion. With this configuration, the first protrusion protrudes downward, and thus the first connecting rotation shaft in an up-down direction can be arranged at substantially the same position as that of the first lower rotation shaft by arranging the first connecting rotation shaft at the end portion on the lower side of the first protrusion. Consequently, the first lower rotation shaft can be easily arranged substantially coaxially with the first connecting rotation shaft. In addition, because the second protrusion protrudes upward, the second connecting rotation shaft in the up-down direction can be arranged at substantially the same position as that of the upper rotation shaft by arranging the second connecting rotation shaft at the end portion on the upper side of the second protrusion. Consequently, the upper rotation shaft can be easily arranged substantially coaxially with the second connecting rotation shaft.

The tilting device in the above aspect further includes: a second lower movable plate arranged below the first lower movable plate and connected to the first lower movable plate in a rotatable manner via a second lower rotation shaft; a third actuator arranged between the first lower movable plate and the second lower movable plate; a third lower movable plate arranged below the second lower movable plate and connected to the second lower movable plate in a rotatable manner via a third lower rotation shaft; a fourth actuator arranged between the second lower movable plate and the third lower movable plate; and a second connecting member that is connected to the first lower movable plate in a rotatable manner via the third connecting rotation shaft at an end portion on one side of a direction orthogonal to the first direction in a plan view, and that is connected to the third lower movable plate in a rotatable manner via a fourth connecting rotation shaft at an end portion on the other side of the direction orthogonal to the first direction in the plan view. With this configuration, the tilting of the second lower movable plate in an unintended direction can be suppressed even if the direction in which the movable plate is tilted is increased according to the number of the movable plates.

Consequently, for example, the tilting of the movable plate in an unintended direction can be suppressed even in a configuration in which a complicated tilting operation is performed by increasing the tilting directions of the movable plate in a front-rear direction and a left-right direction.

In the tilting device in the above aspect, the first actuator includes a first expansion/contraction bag capable of expanding and contracting by supply and exhaustion of gas, and the second actuator includes a second expansion/contraction bag capable of expanding and contracting by supply and exhaustion of gas. The tilting device further includes a control unit that controls adjustment of a tilt angle of the upper movable plate by controlling supply/exhaustion of gas to/from the first expansion/contraction bag and the second expansion/contraction bag. With this configuration, the tilt angle of the upper movable plate can be adjusted by supplying/exhausting gas to/from the first expansion/contraction bag and the second expansion/contraction bag, and thus the configuration of the tilting device can be simplified.

In this case, the tilting device further includes: a flow passage for supplying/exhausting gas to/from the first expansion/contraction bag and the second expansion/contraction bag; a flow passage switching unit for switching the flow passage; and a pump for supplying/exhausting gas to/from the first expansion/contraction bag and the second expansion/contraction bag. The control unit is configured to control the supply/exhaustion of gas to/from the first expansion/contraction bag and the second expansion/contraction bag by controlling the flow passage switching unit and the pump. With this configuration, the first expansion/contraction bag and the second expansion/contraction bag can be expanded and contracted by a single pump by switching the flow passage of the gas using the flow passage switching unit. Consequently, complication of the tilting device and an increase in the size of the tilting device due to an increase in the number of parts can be suppressed as compared with a configuration in which the pump is arranged in each of the first expansion/contraction bag and the second expansion/contraction bag.

In the configuration in which the control unit controls the adjustment of the tilt angle of the upper movable plate, the tilting device further includes an angle sensor for measuring a tilt angle at which the upper movable plate is tilted, and the control unit is configured to perform control in a manner to stop the supply/exhaust of gas to/from the first expansion/contraction bag and the second expansion/contraction bag when the tilt angle measured by the angle sensor becomes a predetermined angle. With this configuration, the gas supply can be stopped when the tilt angle becomes the predetermined angle, and thus the tilt angle can be suppressed from becoming equal to or greater than the predetermined angle. In addition, because the gas exhaust can be stopped when the tilt angle becomes the predetermined angle, the gas exhaust can be stopped when the upper movable plate is returned to a horizontal state by setting the predetermined angle to, for example, 0 degree.

In the configuration in which the control unit controls the adjustment of the tilt angle of the upper movable plate, the tilting device further includes a first pressure sensor that measures pressure inside the first expansion/contraction bag, and a second pressure sensor that measures pressure inside the second expansion/contraction bag, and the control unit is configured to perform control in a manner to stop the gas supply to the first expansion/contraction bag when the pressure inside the first expansion/contraction bag measured by the first pressure sensor exceeds a predetermined first upper limit value, and stop the gas supply to the second expansion/contraction bag when the pressure inside the second expansion/contraction bag measured by the second pressure sensor exceeds a predetermined second upper limit value. With this configuration, excessive expansion of the first expansion/contraction bag can be suppressed. In addition, excessive expansion of the second expansion/contraction bag can also be suppressed.

[Effect]

According to the disclosure, it is possible to provide a tilting device that can suppress tilting of a movable plate in an unintended direction due to arrangement of an object to be tilted when the tilting device is tilted.

DESCRIPTION OF THE EMBODIMENTS

Hereinafter, embodiments embodying the disclosure are described with reference to the drawings.

First Embodiment

A configuration according to a first embodiment of the disclosure is described with reference to FIGS. 1 to 21.

Figure 1:
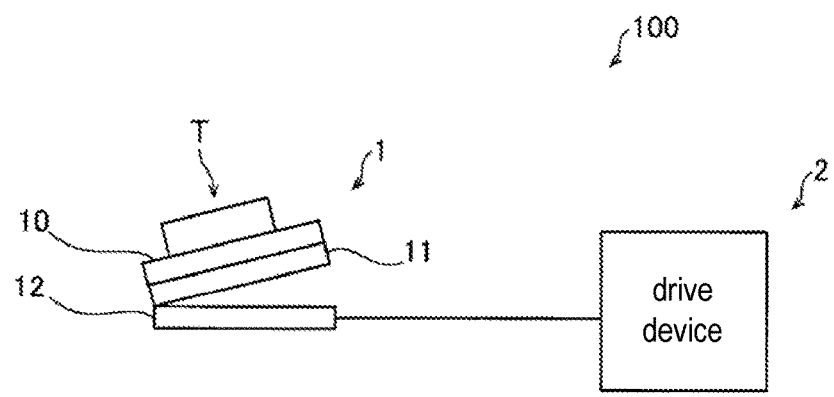
FIG. 1 is a block diagram showing a configuration of a tilting device according to a first embodiment.

As shown in FIG. 1, a tilting device 100 according to the first embodiment includes a movable portion 1 and a drive device 2. The tilting device 100 is configured to tilt an object T to be tilted arranged on the movable portion 1 by tilting the movable portion 1 by the drive device 2.

As shown in FIG. 1, the movable portion 1 includes an upper movable plate 10, an intermediate movable plate 11, and a first lower movable plate 12.

Figure 2:
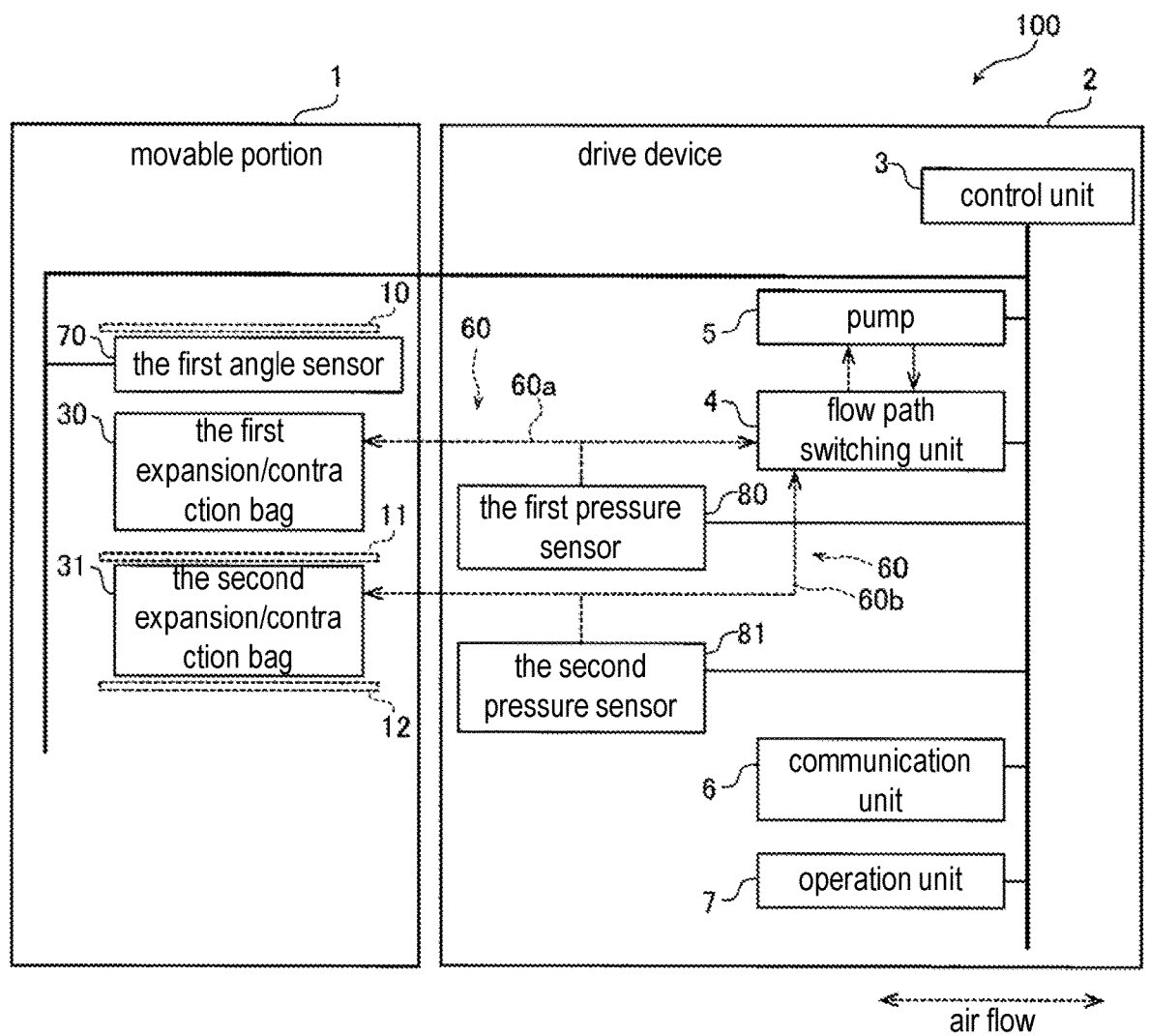
FIG. 2 is a block diagram showing configurations of a movable portion and a drive device of the tilting device according to the first embodiment.

As shown in FIG. 2, the movable portion 1 includes a first actuator and a second actuator. In addition, as shown in FIG. 2, the drive device 2 includes a control unit 3, a flow passage switching unit 4, a pump 5, a communication unit 6, and an operation unit 7.

The first actuator is arranged between the upper movable plate 10 and the intermediate movable plate 11. The first actuator is configured to rotate the upper movable plate 10. The first actuator includes a first expansion/contraction bag 30 that can be expanded and contracted by supply and exhaustion of gas. The second actuator is arranged between the intermediate movable plate 11 and the first lower movable plate 12. The second actuator is configured to rotate the upper movable plate 10 together with the intermediate movable plate 11. The second actuator includes a second expansion/contraction bag 31 that can be expanded and contracted by supply and exhaustion of gas. The first expansion/contraction bag 30 and the second expansion/contraction bag 31 are configured to be expanded and contracted by supply and exhaustion of gas (air). Note that, in the first embodiment, as an example of the "gas" to be supplied and exhausted, an example is shown in which air (around the drive device 2) is used, but the gas to be supplied and exhausted may be oxygen, carbon dioxide, nitrogen and water vapor that can easily get, or may be a rare gas such as helium, neon, argon, or the like, which are stable gases. In addition, the gas to be supplied and exhausted may be a mixed gas of the above gases.

As shown in FIG. 2, the movable portion 1 includes a first angle sensor 70. The first angle sensor 70 is a sensor for detecting a tilt angle θ1 (see FIG. 16) at which the upper movable plate 10 is tilted, and is arranged on the lower surface of the upper movable plate 10. Note that, the tilt angle θ1 is a tilt angle of the upper movable plate 10 with respect to a horizontal plane when the movable portion 1 rotates in a positive direction or a negative direction described later. In addition, the "first angle sensor 70" is an example of an "angle sensor" in the claims.

In addition, the first angle sensor 70 is connected to the control unit 3 of the drive device 2 and is configured to transmit a detected tilt angle to the control unit 3. Further, the first angle sensor 70 is configured to be capable of detecting the direction of gravitational acceleration. The first angle sensor 70 includes, for example, an acceleration sensor that detects tilting of the sensor based on the acceleration.

The control unit 3 is configured to control the supply/exhaustion of gas to/from the first expansion/contraction bag 30 and the second expansion/contraction bag 31 by controlling the flow passage switching unit 4 and the pump 5. In addition, the control unit 3 is configured to control the adjustment of the tilt angle θ1 (see FIG. 16) of the upper movable plate 10 by controlling the supply/exhaustion of gas to/from the first expansion/contraction bag 30 and the second expansion/contraction bag 31. Specifically, the control unit 3 is configured to control the flow passage switching unit 4 and the pump 5 based on an instruction received by the communication unit 6 and an operation received by the operation unit 7, expand and contract each expansion/contraction bag, and rotate the upper movable plate 10 around a rotation axis.

In addition, in the first embodiment, the control unit 3 controls the supply/exhaustion of gas (air) to/from the first expansion/contraction bag 30 and the second expansion/contraction bag 31 in a manner of tilting the upper movable plate 10 based on the tilt angle θ1 (see FIG. 16) of the upper movable plate 10 as described later.

Besides, as shown in FIG. 2, the tilting device 100 includes a flow passage 60 for supplying/exhausting gas to/from the first expansion/contraction bag 30 and the second expansion/contraction bag 31. The flow passage 60 includes a first flow passage 60a that connects the first expansion/contraction bag 30 and the pump 5, and a second flow passage 60b that connects the second expansion/contraction bag 31 and the pump 5.

The flow passage switching unit 4 is configured to switch the flow passage 60. Specifically, the flow passage switching unit 4 is configured to connect the first flow passage 60a and the pump 5 when supplying/exhausting gas (air) to/from the first expansion/contraction bag 30. In addition, the flow passage switching unit 4 is configured to connect the second flow passage 60b and the pump 5 when supplying/exhausting gas (air) to/from the second expansion/contraction bag 31. The flow passage switching unit 4 includes a solenoid valve and is connected to the control unit 3.

The pump 5 is connected, via the flow passage 60, to the first expansion/contraction bag 30 and the second expansion/contraction bag 31 that are arranged in the movable portion 1, and is configured to supply/exhaust gas to/from the first expansion/contraction bag 30 and the second expansion/contraction bag 31.

The communication unit 6 is configured to receive an operation instruction for controlling the tilting device 100 transmitted from an external host device via at least one of wireless communication and wired communication. The communication unit 6 is connected to the control unit 3, and the received operation instruction is transmitted to the control unit 3.

The operation unit 7 is arranged for an operator to operate the tilting device 100, and is configured to receive an input operation of the operator. The received operation is transmitted to the control unit 3.

In addition, the drive device 2 includes a first pressure sensor 80 that measures the pressure inside the first expansion/contraction bag 30, and a second pressure sensor 81 that measures the pressure inside the second expansion/contraction bag 31. The first pressure sensor 80 and the second pressure sensor 81 are connected to the control unit 3 and are configured to transmit pressure measurement result to the control unit 3.

(Configuration of Movable Portion)

Figure 3:
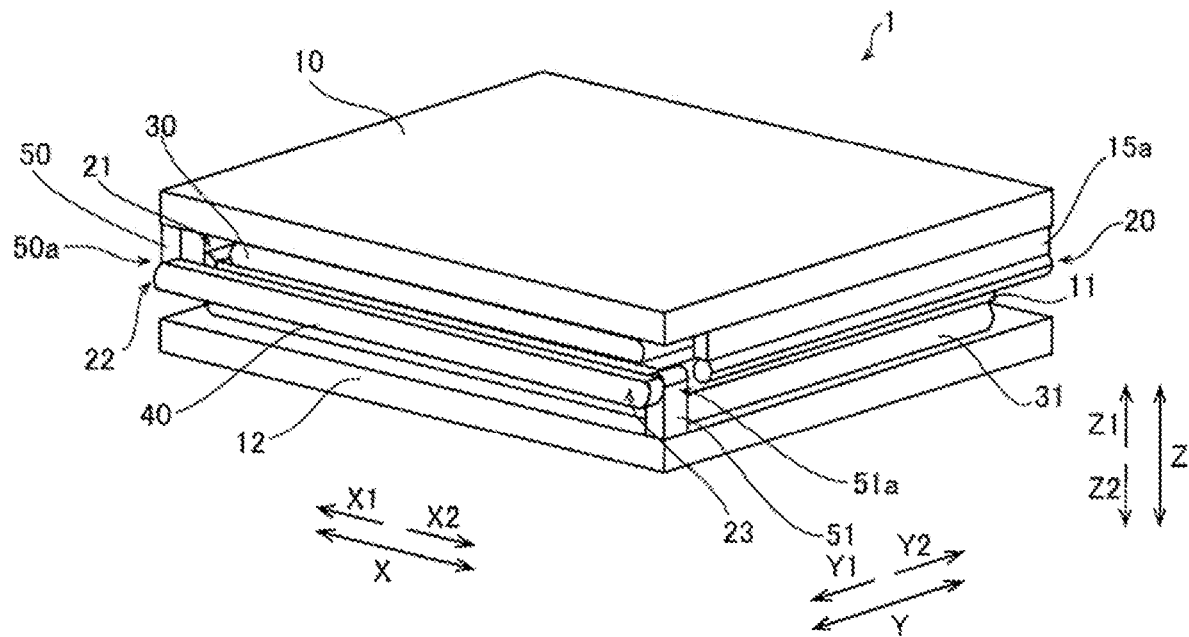
FIG. 3 is a perspective view of the movable portion according to the first embodiment.

As shown in FIG. 3, the upper movable plate 10 is arranged on a side on which the object T to be tilted (see FIG. 1) is arranged. In other words, the upper movable plate 10 is arranged at the uppermost position of the movable portion 1. The intermediate movable plate 11 is arranged below the upper movable plate 10 and is connected to the upper movable plate 10 in a rotatable manner via an upper rotation shaft 20. The first lower movable plate 12 is arranged below the intermediate movable plate 11 and is connected to the intermediate movable plate 11 in a rotatable manner via a first lower rotation shaft 21. The upper rotation shaft 20 and the first lower rotation shaft 21 include, for example, hinges and the like. Moreover, in the following, the up-down direction is defined as a Z direction, the upward direction is defined as a Z1 direction, and the downward direction is defined as a Z2 direction. In addition, in a plane orthogonal to the Z direction, two directions orthogonal to each other are defined as an X direction and a Y direction. One side of the X direction is defined as an X1 direction and the other side of the X direction is defined as an X2 direction. One side of the Y direction is defined as a Y1 direction and the other side of the Y direction is defined as a Y2 direction.

Each of the upper movable plate 10, the intermediate movable plate 11, and the first lower movable plate 12 includes a plate-shaped member including a honeycomb structure and a pair of aluminum materials sandwiching the honeycomb structure. It should be noted that each movable plate may be a member that has an outer shape having a length sufficiently large on the plane as compared with the thickness. For example, each movable plate may be a solid member or a hollow plate member. Alternatively, each movable plate may be a member having holes formed therein or a grid-like member.

In addition, as shown in FIG. 3, the movable portion 1 includes a first connecting member 40 that connects the upper movable plate 10 and the first lower movable plate 12. As shown in FIG. 3, the first connecting member 40 has a rod-like shape. The first connecting member 40 is connected to the first lower movable plate 12 via a second connecting rotation shaft 23. The second connecting rotation shaft 23 is constituted of, for example, a pin member (not shown) and a hole portion (not shown). The first connecting member 40 is preferably reinforced by bending a thin plate material into an L shape for weight lightening.

Besides, as shown in FIG. 3, the movable portion 1 includes a first protrusion 50 and a second protrusion 51. In addition, the second protrusion 51 is arranged more outward than the upper rotation shaft 20 in a third direction of the first lower movable plate 12, and is configured to protrude upward from the first lower movable plate 12 toward the upper movable plate 10. In the first embodiment, as shown in FIG. 3, the second connecting rotation shaft 23 is arranged at an end portion 51a on the upper side of the second protrusion 51.

Figure 4:
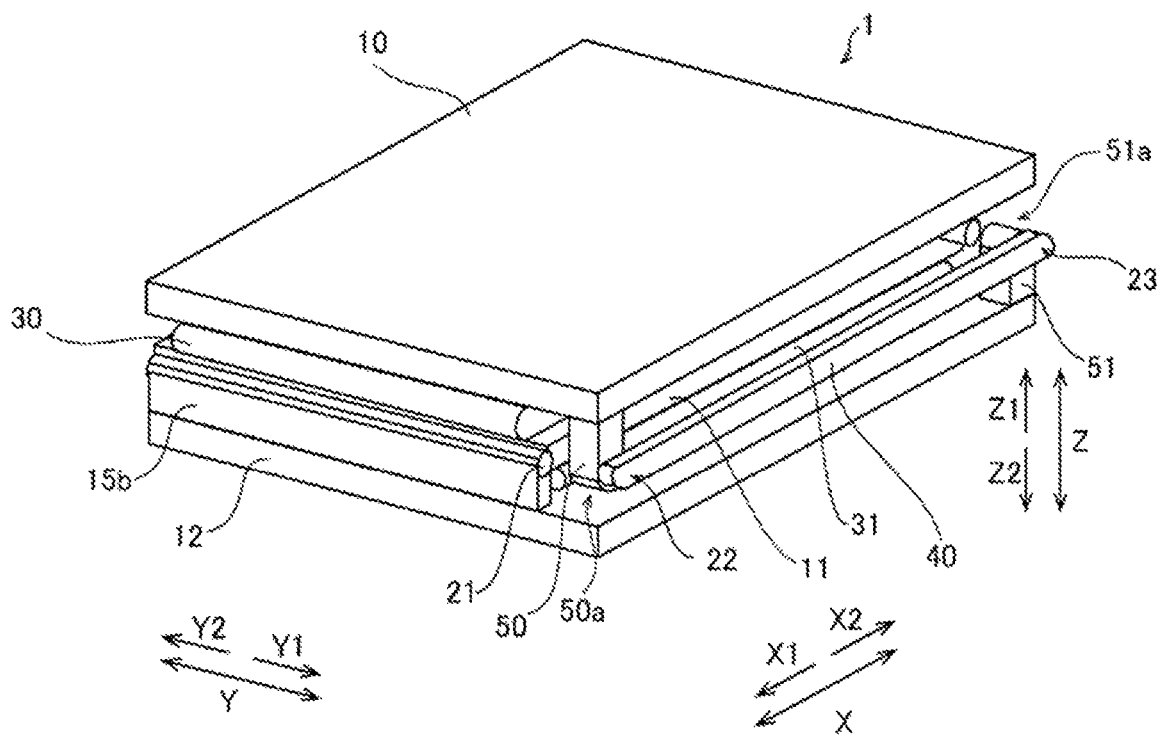
FIG. 4 is a perspective view of the movable portion according to the first embodiment when viewed from a direction different from that of FIG. 3.

As shown in FIG. 4, the first connecting member 40 is connected to the upper movable plate 10 via a first connecting rotation shaft 22. The first connecting rotation shaft 22 is constituted of, for example, a pin member 22a (see FIG. 12) inserted into a hole portion 50d (see FIG. 12). The detailed configuration of the first connecting rotation shaft 22 is described later. In addition, as shown in FIG. 4, the first protrusion 50 is arranged more outward (Y1 direction side) than the first lower rotation shaft 21 in the third direction (Y1 direction) of the upper movable plate 10, and is configured to protrude downward (toward the Z2 direction) from the upper movable plate 10 toward the first lower movable plate 12. In the first embodiment, as shown in FIG. 4, the first connecting rotation shaft 22 is arranged at an end portion 50a on the lower side of the first protrusion 50.

(Shape of Movable Portion and Direction in which Rotation Shaft Extends)

Figure 5:
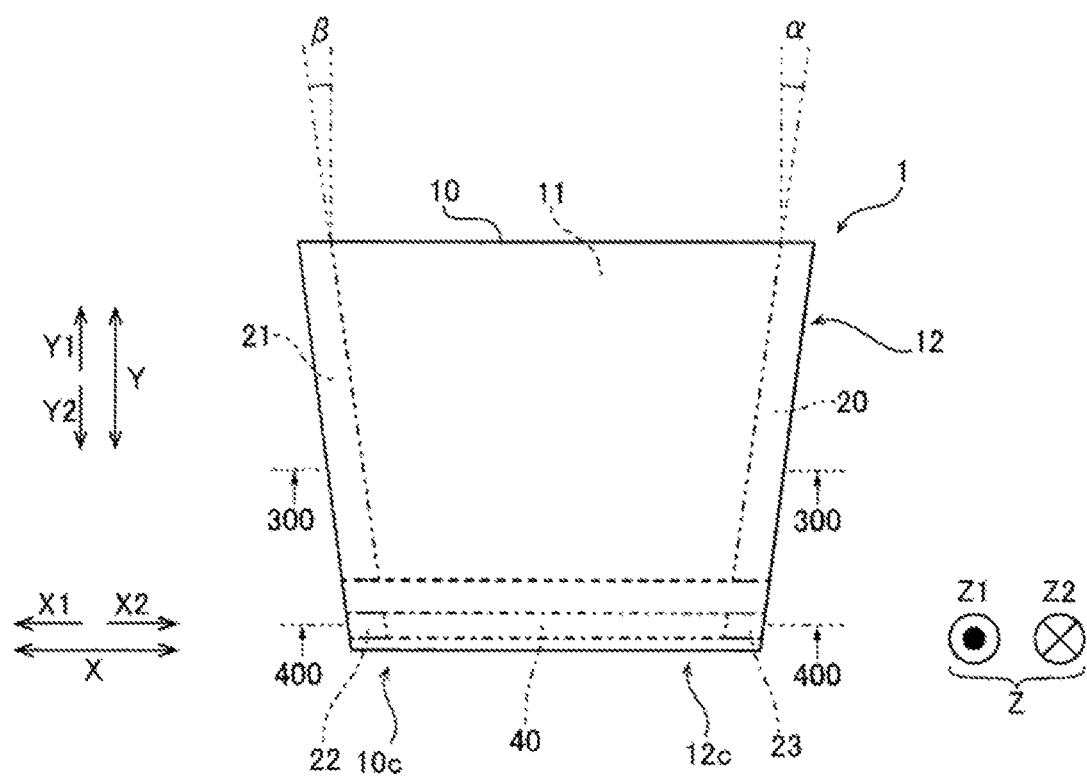
FIG. 5 is a schematic view of the movable portion according to the first embodiment in a plan view.

FIG. 5 is a plan view of the movable portion 1 when viewed from the Z1 direction side. Moreover, in the example shown in FIG. 5, the intermediate movable plate 11 is illustrated by a broken line. In addition, in the example shown in FIG. 5, the first connecting member 40 is illustrated by a dot-and-dash line.

As shown in FIG. 5, the first connecting member 40 is configured to extend in a direction intersecting the upper rotation shaft 20 and the first lower rotation shaft 21 in a plan view. In the embodiment, for example, the upper rotation shaft 20 and the first lower rotation shaft 21 are configured to extend substantially in the Y direction in a plan view, and the first connecting member 40 is configured to extend in the X direction in a plan view. Specifically, the upper rotation shaft 20 is arranged in a state of being tilted outward (toward the X2 direction side) at an angle $\alpha$ with respect to the Y direction. In addition, the first lower rotation shaft 21 is arranged in a state of being tilted outward (toward the X1 direction side) at an angle $\beta$ with respect to the Y direction. Additionally, as shown in FIG. 5, the first connecting member 40 is arranged at an end portion 10c of the upper movable plate 10 and an end portion 12c of the first lower movable plate 12 in the third direction (Y1 direction) which is on one side of the direction (Y direction) orthogonal to a first direction (X1 direction) and a second direction (X2 direction) in a plan view.

In addition, as shown in FIG. 5, in the first embodiment, the first connecting rotation shaft 22 is arranged on the end portion 10c side of the upper movable plate 10 and more outward (Y1 direction side) than the first lower rotation shaft 21 in the third direction (Y1 direction). In addition, the second connecting rotation shaft 23 is arranged on the end portion 12c side of the first lower movable plate 12 and more outward (Y1 direction side) than the upper rotation shaft 20 in the third direction (Y1 direction).

(Connection of Movable Plate and First Connecting Member)

Figure 6:
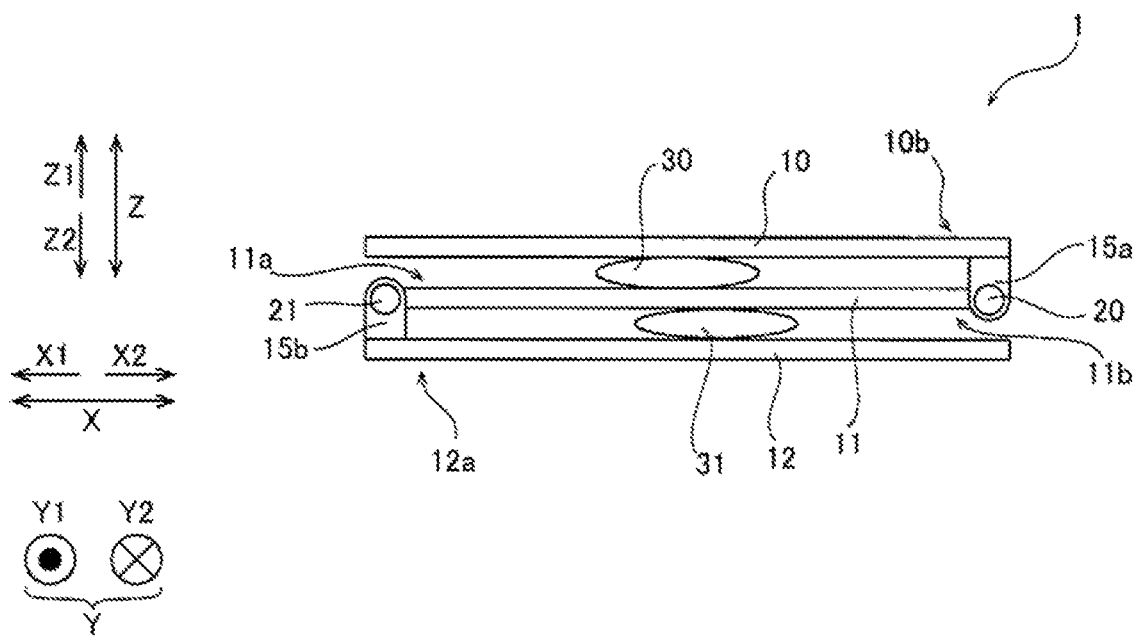
FIG. 6 is a cross-sectional view along line 300-300 in FIG. 5.

FIG. 6 is a schematic view of a cross section along line 300-300 in FIG. 5 when viewed from the Y1 direction side. As shown in FIG. 6, an end portion 10b of the upper movable plate 10 on the X2 direction side is connected to an end portion 11b of the intermediate movable plate 11 on the X2 direction side via the upper rotation shaft 20. The upper rotation shaft 20 is arranged on the upper movable plate 10 via a first spacer member 15a. Accordingly, the height position of the upper rotation shaft 20 can be adjusted by changing the size of the first spacer member 15a in the up-down direction (Z direction). In addition, an end portion 11a of the intermediate movable plate 11 on the X1 direction side is connected to an end portion 12a of the first lower movable plate 12 on the X1 direction side via the first lower rotation shaft 21. The first lower rotation shaft 21 is arranged on the first lower movable plate 12 via a second spacer member 15b. Accordingly, the height position of the first lower rotation shaft 21 can be adjusted by changing the size of the second spacer member 15b in the up-down direction (Z direction).

Figure 7:
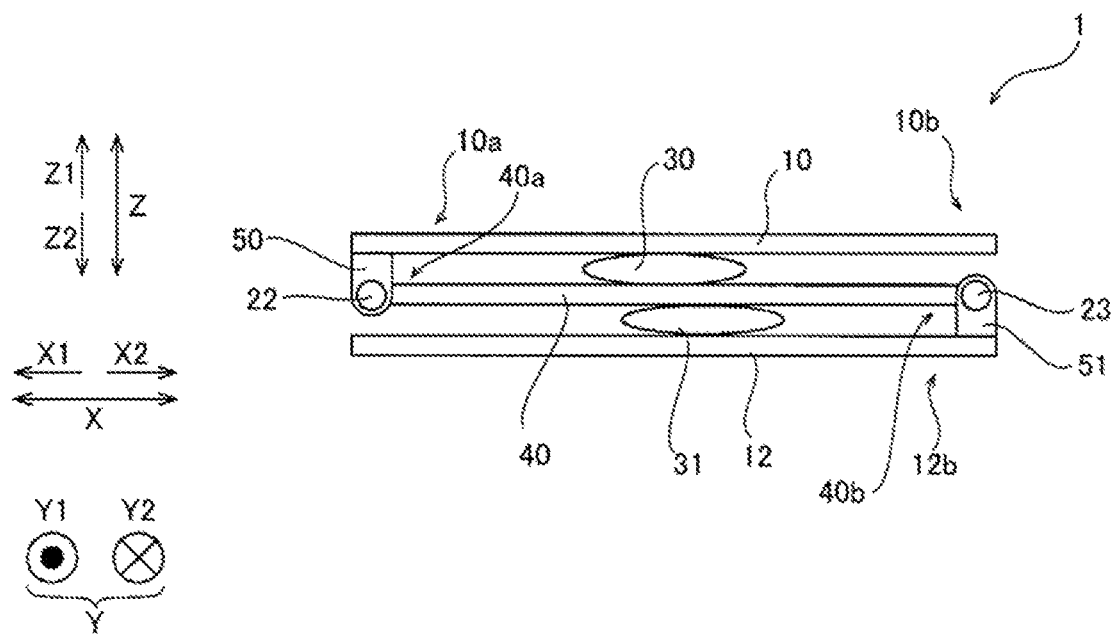
FIG. 7 is a cross-sectional view along line 400-400 in FIG. 5.

FIG. 7 is a schematic view of a cross section along line 400-400 in FIG. 5 when viewed from the Y1 direction. As shown in FIG. 7, the first connecting member 40 is connected to the upper movable plate 10 in a rotatable manner via the first connecting rotation shaft 22 at an end portion 10a on the first direction (X1 direction) side opposite to the end portion 10b at which the upper movable plate 10 is connected to the intermediate movable plate 11. In other words, an end portion 40a of the first connecting member 40 on the X1 direction side is connected to the end portion 10a of the upper movable plate 10 on the X1 direction side via the first connecting rotation shaft 22.

In addition, the first connecting member 40 is connected to the first lower movable plate 12 in a rotatable manner via the second connecting rotation shaft 23 at an end portion 12b on the second direction (X2 direction) side opposite to the first direction (X1 direction). In other words, an end portion 40b of the first connecting member 40 on the X2 direction side is connected to the end portion 12b of the first lower movable plate 12 on the X2 direction side via the second connecting rotation shaft 23.

(First Connecting Member)

Figure 8:
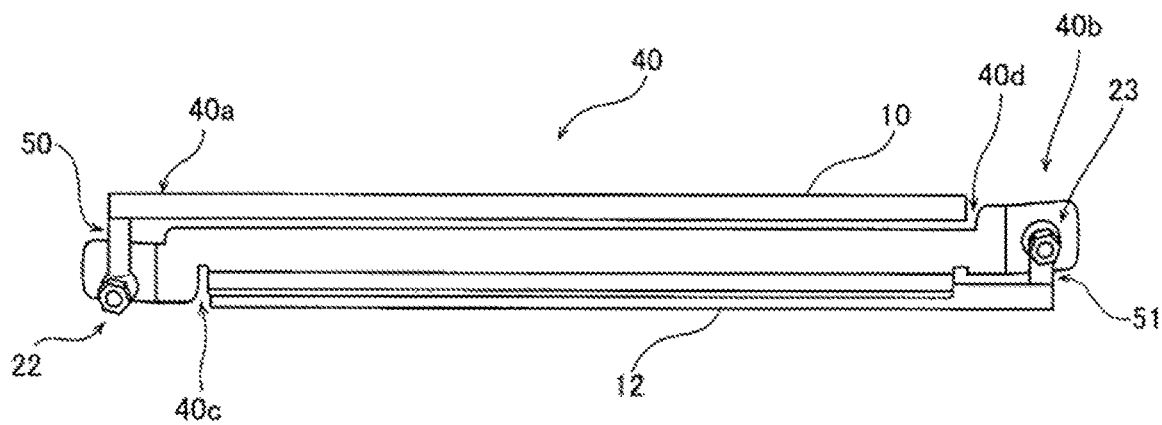
FIG. 8 is a schematic view for illustrating a configuration of a first connecting member.
Figure 8:
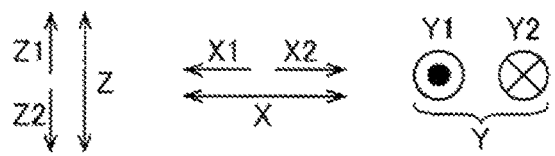

FIG. 8 is a schematic view of the first connecting member 40 when viewed from the Y1 direction side. As shown in FIG. 8, the first connecting rotation shaft 22 is arranged at the end portion 40a of the first connecting member 40 on the X1 direction side. In addition, the first protrusion 50 is arranged at the end portion 40a of the first connecting member 40 on the X1 direction side. Additionally, a notch 40c is arranged in the vicinity of the end portion 40a of the first connecting member 40 on the X1 direction side. Accordingly, by arranging the first lower movable plate 12 inside the notch 40c, the position of the lower end portion of the first lower movable plate 12 arranged on the lower side (Z2 direction side) of the first connecting member 40 can be shifted to the upper side (Z1 direction side), and thus the size of the movable portion 1 in the up-down direction (Z direction) can be reduced.

In addition, as shown in FIG. 8, the second connecting rotation shaft 23 is arranged at the end portion 40b of the first connecting member 40 on the X2 direction side. Additionally, the second protrusion 51 is arranged at the end portion 40b of the first connecting member 40 on the X2 direction side. Besides, a notch 40d is arranged in the vicinity of the end portion 40b of the first connecting member 40 on the X2 direction side. Accordingly, by arranging the upper movable plate 10 inside the notch 40d, the position of the upper end portion of the upper movable plate 10 arranged on the upper side (Z1 direction side) of the first connecting member 40 can be shifted to the lower side (Z2 direction side), and thus the size of the movable portion 1 in the up-down direction (Z direction) can be reduced.

Figure 9:
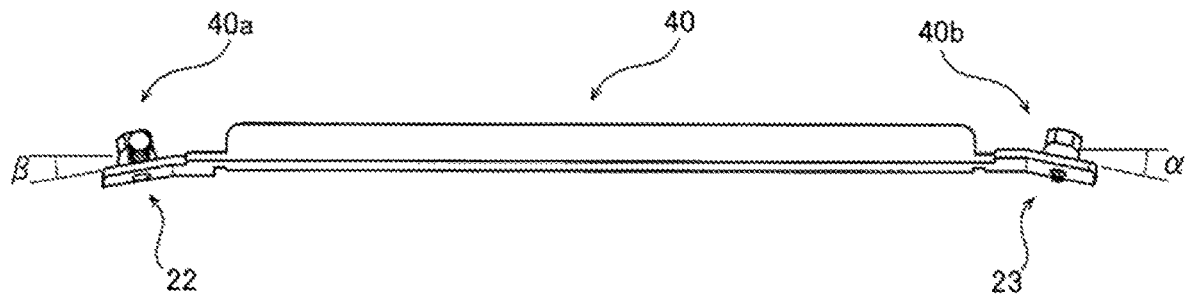
FIG. 9 is a schematic view of the first connecting member in a plan view.
Figure 9:
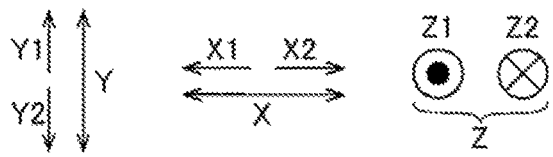

FIG. 9 is a schematic view of the first connecting member 40 when viewed from the Z1 direction. In the first embodiment, the first lower rotation shaft 21 (see FIG. 5) is arranged in a state of being tilted outward (toward the X1 direction side) at the angle β. When the upper movable plate 10 and the intermediate movable plate 11 rotate around the axis of the first lower rotation shaft 21, the first connecting member 40 also rotates together with the upper movable plate 10 in the same direction around the axis of the second connecting rotation shaft 23. Thus, it is preferable that the first lower rotation shaft 21 and the first connecting rotation shaft 22 face directions substantially the same as each other. Therefore, in the first embodiment, in order to tilt the first connecting rotation shaft 22 at the angle β with respect to the horizontal direction (X direction), the end portion 40a of the first connecting member 40 on the X1 direction side is bent at the angle β.

In addition, in the first embodiment, the upper rotation shaft 20 (see FIG. 5) is arranged in a state of being tilted outward (toward the X1 direction side) at the angle α. The first connecting member 40 does not rotate when the intermediate movable plate 11 rotates around the axis of the first connecting rotation shaft 22 or when the upper movable plate 10 rotates around the axis of the upper rotation shaft 20. However, the upper movable plate 10 is connected to the first connecting member 40 by the first connecting rotation shaft 22. Therefore, when the upper movable plate 10 rotates together with the intermediate movable plate 11, the upper movable plate 10 rotates around the axis of the first lower rotation shaft 21 and also rotates around the axis of the second connecting rotation shaft 23. Thus, it is preferable that the first lower rotation shaft 21 and the second connecting rotation shaft 23 face directions substantially the same as each other. Therefore, in the first embodiment, in order to tilt the second connecting rotation shaft 23 at the angle α with respect to the horizontal direction (X direction), the end portion 40b of the first connecting member 40 on the X2 direction side is bent at the angle α.

(Configuration of Upper Rotation Shaft)

Next, the configuration of the upper rotation shaft 20 is described with reference to FIG. 10 and FIG. 11. Note that, the configuration of the first lower rotation shaft 21 is the same as that of the upper rotation shaft 20, and thus the detailed description thereof is omitted.

Figure 10:
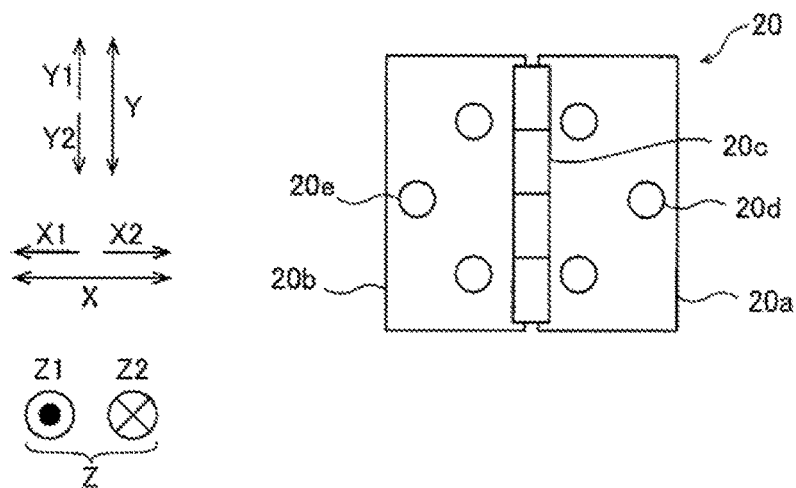
FIG. 10 is a schematic view for illustrating a configuration of an upper rotation shaft.

As shown in FIG. 10, the upper rotation shaft 20 includes a first connecting portion 20a, a second connecting portion 20b, and a rotation shaft portion 20c. The rotation shaft portion 20c connects the first connecting portion 20a and the second connecting portion 20b in a rotatable manner. In addition, a plurality of hole portions 20d are arranged in the first connecting portion 20a. Accordingly, the first connecting portion 20a can be fixed to the upper movable plate 10 by, for example, screws or the like. In addition, a plurality of hole portions 20e are arranged in the second connecting portion 20b. Accordingly, the second connecting portion 20b can be fixed to the intermediate movable plate 11 by, for example, screws or the like.

Figure 11:
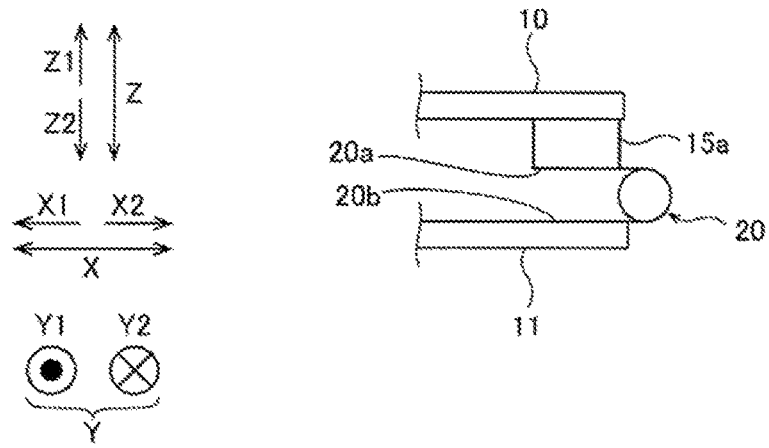
FIG. 11 is a schematic view for illustrating a configuration in which the upper rotation shaft is connected to an upper movable plate and an intermediate movable plate.

In addition, as shown in FIG. 11, the upper rotation shaft 20 is fixed to the upper movable plate 10 via the first spacer member 15a. In the example shown in FIG. 11, the first connecting portion 20a is fixed to the first spacer member 15a, and the second connecting portion 20b is fixed to the intermediate movable plate 11. Accordingly, the height position of the upper rotation shaft 20 in the Z direction can be adjusted by changing the size of the first spacer member 15a in the Z direction.

(Configuration of First Connecting Rotation Shaft)

Next, the configuration of the first connecting rotation shaft 22 is described with reference to FIG. 12. Note that, the configuration of the second connecting rotation shaft 23 is the same as that of the first connecting rotation shaft 22, and thus the detailed description thereof is omitted.

Figure 12:
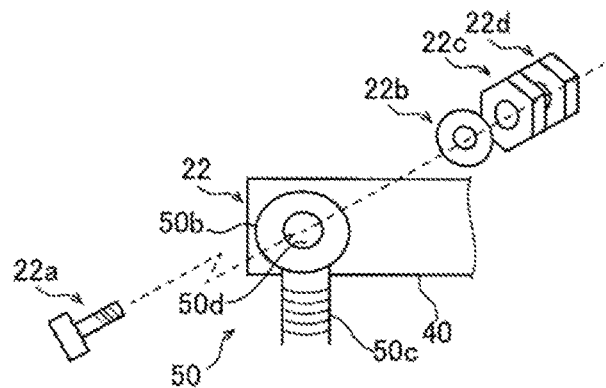
FIG. 12 is a schematic view for illustrating a configuration of a first connecting rotation shaft.

As shown in FIG. 12, the first connecting rotation shaft 22 includes the pin member 22a, a washer 22b, a first nut 22c, and a second nut 22d. In addition, the first protrusion 50 includes an annular portion 50b provided with the hole portion 50d and a threaded portion 50c provided with a thread. The first protrusion 50 is configured in a manner that the height position thereof can be adjusted by rotating the annular portion 50b. The first protrusion 50 includes, for example, an eyebolt.

In the first embodiment, the first connecting rotation shaft 22 is configured to fix the first connecting member 40 in a rotatable manner by fixing the pin member 22a with the washer 22b, the first nut 22c, and the second nut 22d in a state that the pin member 22a is inserted into the hole portion 50d.

(Size of Each Movable Plate)

Figure 13:
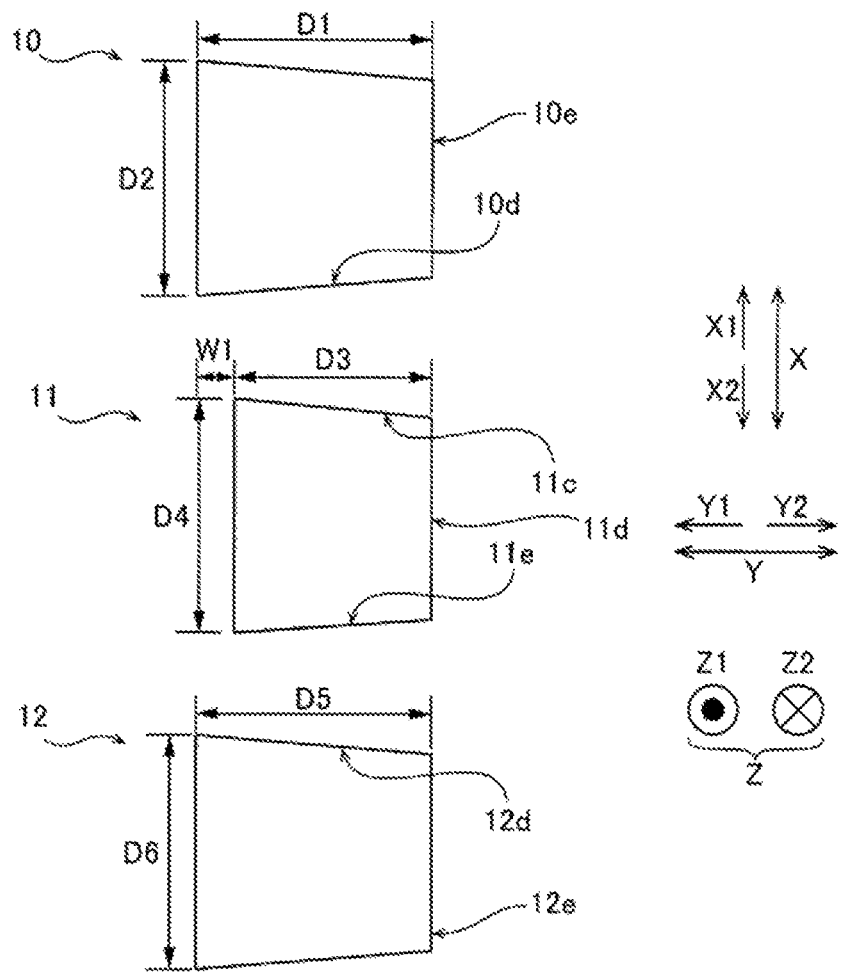
FIG. 13 is a schematic view for illustrating the size of a movable plate according to the first embodiment in a plan view.

FIG. 13 is a plan view of the upper movable plate 10, the intermediate movable plate 11, and the first lower movable plate 12 when viewed from the Z1 direction toward the Z2 direction. Note that, in the example shown in FIG. 13, for the sake of explanation, each movable plate is shown in a state of being deviated in the X direction.

As shown in FIG. 13, the upper movable plate 10 has a trapezoidal shape having a long side and a short side parallel to each other in a plan view. Specifically, the upper movable plate 10 has a side 10d extending in a direction (Y direction) along the upper rotation shaft 20 (see FIG. 3) and a side 10e extending in a direction orthogonal to the upper rotation shaft 20 (X direction) in a plan view. The length of the side 10d is a length D1 and the length of the side 10e is a length D2.

In addition, the intermediate movable plate 11 has a trapezoidal shape having a long side and a short side parallel to each other in a plan view. Specifically, the intermediate movable plate 11 has sides 11c and 11e extending in the direction (Y direction) along the upper rotation shaft 20 (see FIG. 3), and a side 11d extending in the direction orthogonal to the upper rotation shaft 20 (X direction) in a plan view. The length of the side 11c and the side 11e is a length D3, and the length of the side 11d is a length D4.

Besides, the first lower movable plate 12 has a trapezoidal shape having a long side and a short side parallel to each other in a plan view. Specifically, the first lower movable plate 12 has a side 12d extending in the direction (Y direction) along the upper rotation shaft 20 (see FIG. 3) and a side 12e extending in the direction orthogonal to the upper rotation shaft 20 (X direction) in a plan view. The length of the side 12d is a length D5, and the length of the side 12e is a length D6.

In the first embodiment, as shown in FIG. 13, the length D1 of the upper movable plate 10 in the direction (Y direction) along the upper rotation shaft 20 is larger than the length D3 of the intermediate movable plate 11 in the direction (Y direction) along the upper rotation shaft 20. In addition, the length D5 of the first lower movable plate 12 in the direction (Y direction) along the first lower rotation shaft 21 is larger than the length D3 of the intermediate movable plate 11 in the direction (Y direction) along the first lower rotation shaft 21. Moreover, the length D1 of the side 10d and the length D5 of the side 12d are substantially equal to each other. In addition, the length D2 of the side 10e, the length D4 of the side 11d, and the length D6 of the side 12e are substantially equal to each other. Therefore, the upper movable plate 10, the intermediate movable plate 11, and the first lower movable plate 12 are arranged in a manner of overlapping each other in a plan view. In addition, the first connecting member 40 is on the Y1 direction side of the intermediate movable plate 11 and is arranged within a width W1 which is a difference between the length D1 of the upper movable plate 10 and the length D2 of the intermediate movable plate 11.

(Rotation Direction of Movable Portion)

Figure 14:
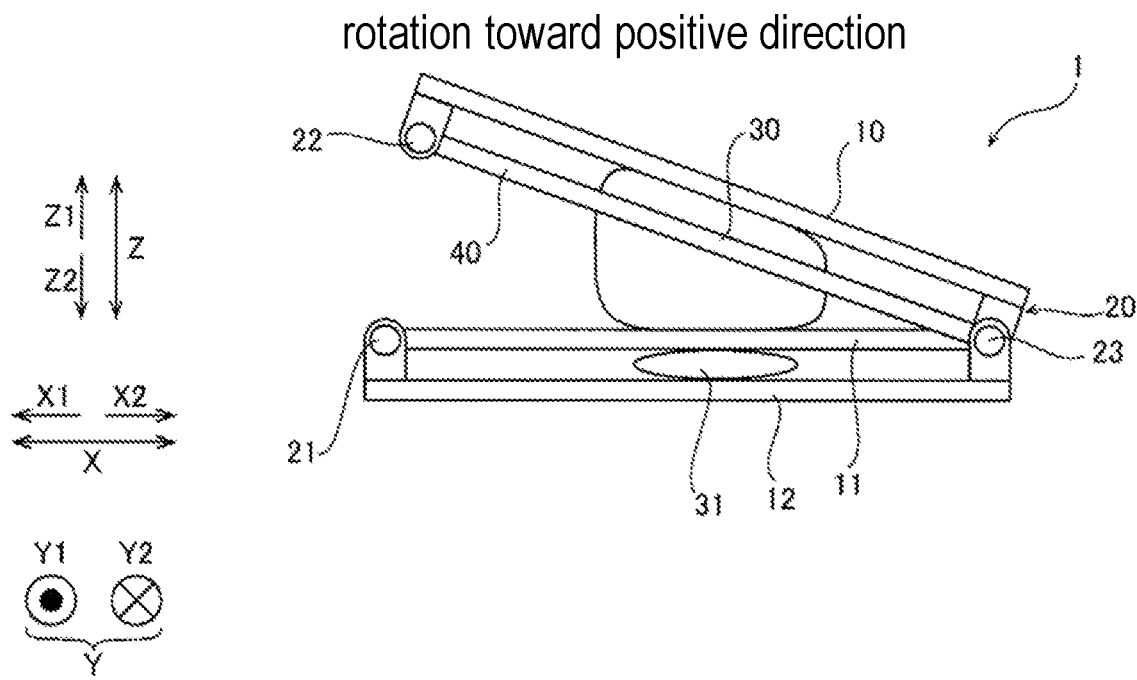
FIG. 14 is a schematic view for illustrating a configuration in which the movable plate according to the first embodiment is rotated in a positive direction.

Next, the rotation direction of the movable portion 1 is described with reference to FIGS. 14 and 15. The example shown in FIG. 14 shows a case in which the movable portion 1 is rotated in a positive direction. Note that, the positive direction is a rotation direction when the upper movable plate 10 is rotated clockwise around the axis of the upper rotation shaft 20 (the second connecting rotation shaft 23) when viewed from the Y1 direction side toward the Y2 direction side. When the movable portion 1 is rotated in the positive direction, the control unit 3 expands the first expansion/contraction bag 30.

When the movable portion 1 is rotated in the positive direction, and the upper movable plate 10 is rotated in the positive direction around the upper rotation shaft 20, the first connecting member 40 rotates together with the upper movable plate 10 around the second connecting rotation shaft 23. Thus, the upper rotation shaft 20 and the second connecting rotation shaft 23 are kept in a manner of not deviating from substantially the same axis. Therefore, because the movement of the upper rotation shaft 20 is restricted, the rotation of the intermediate movable plate 11 in a negative direction described later is suppressed, and the rise of the upper movable plate 10 is also suppressed.

Figure 15:
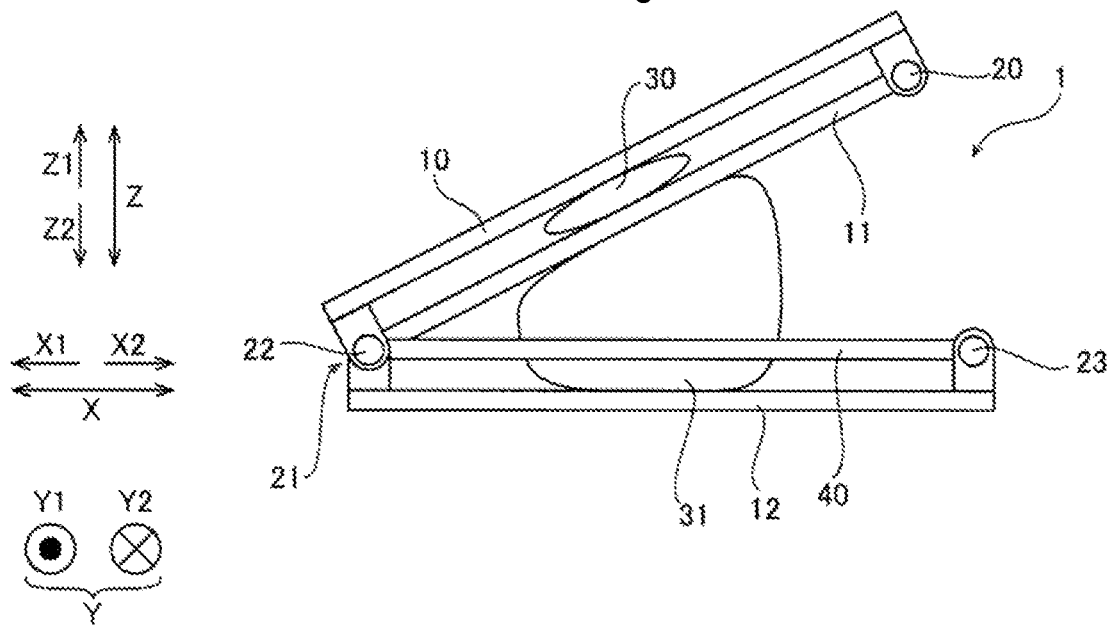
FIG. 15 is a schematic view for illustrating a configuration in which the movable plate according to the first embodiment is rotated in a negative direction.

The example shown in FIG. 15 shows a case in which the movable portion 1 is rotated in the negative direction. Note that, the negative direction is a rotation direction when the upper movable plate 10 is rotated counterclockwise around the axis of the first lower rotation shaft 21 (the first connecting rotation shaft 22) when viewed from the Y1 direction side toward the Y2 direction side. When the movable portion 1 is rotated in the negative direction, the control unit 3 expands the second expansion/contraction bag 31.

When the movable portion 1 is rotated in the negative direction, the intermediate movable plate 11 rotates in the negative direction around the first lower rotation shaft 21 as the second expansion/contraction bag 31 expands. Because the upper movable plate 10 is connected to the intermediate movable plate 11 via the upper rotation shaft 20, the upper movable plate 10 rotates together with the intermediate movable plate 11 in the negative direction as the intermediate movable plate 11 rotates. Thus, the first lower rotation shaft 21 and the first connecting rotation shaft 22 are kept in a manner of not deviating from substantially the same axis. Therefore, because the movement of the first connecting rotation shaft 22 is restricted, the rotation of the first connecting member 40 toward the negative direction is suppressed, and the rise of the upper movable plate 10 is also suppressed.

(Tilting of Movable Plate)

A configuration in which the tilting device 100 according to the first embodiment tilts the object T to be tilted is described with reference to FIG. 16. The control unit 3 switches the movable portion 1 between a first tilted state and a second tilted state by controlling the supply/exhaustion of gas to/from the first expansion/contraction bag 30 and the second expansion/contraction bag 31.

Figure 16:
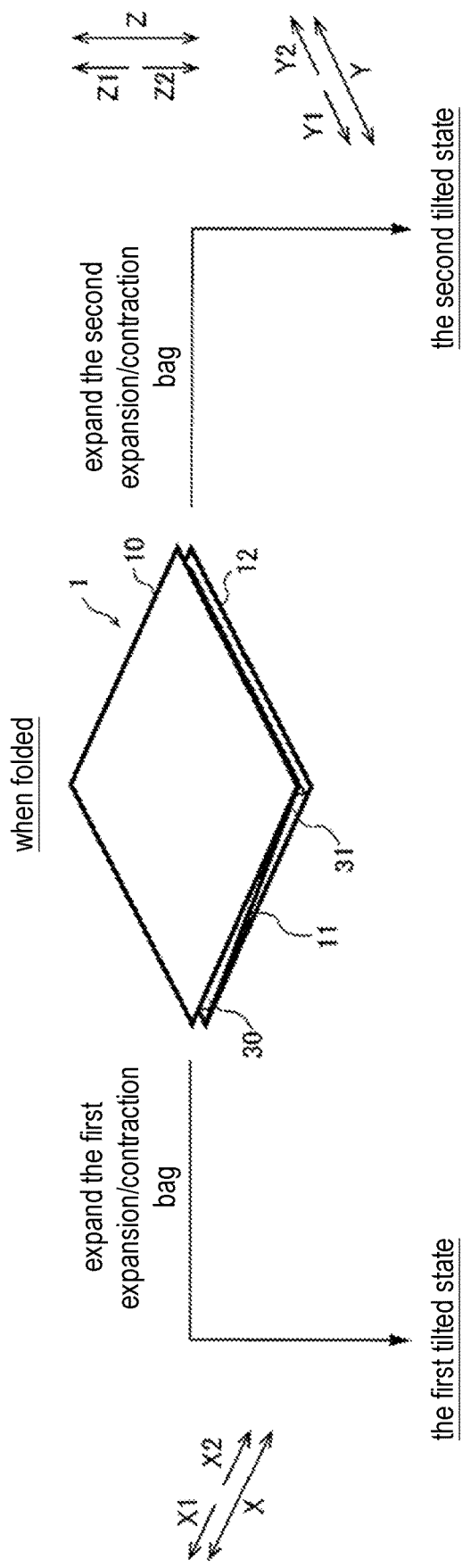
FIG. 16 is a schematic view for illustrating tilting of an object to be tilted by the tilting device according to the first embodiment.
Figure 16:
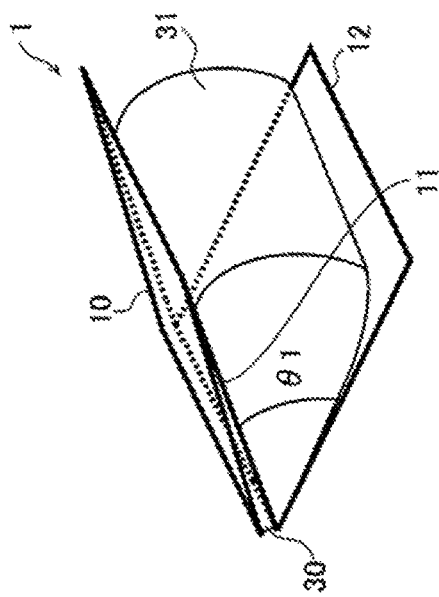
Figure 16:
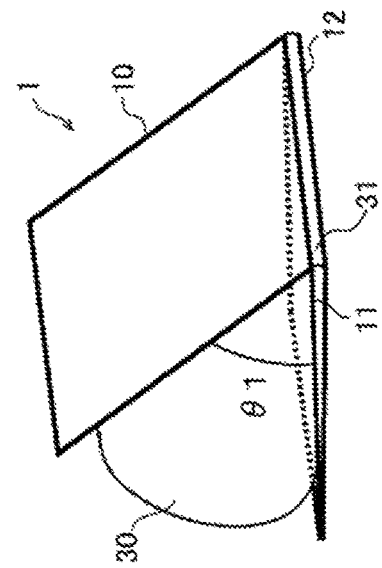

As shown in FIG. 16, in the first tilted state, for example, the upper movable plate 10 is rotated around the axis of the upper rotation shaft 20 (see FIG. 3) by expanding the first expansion/contraction bag 30. In addition, in the first tilted state, the intermediate movable plate 11 and the first lower movable plate 12 are maintained in a non-rotating state by not expanding the second expansion/contraction bag 31. That is, the first tilted state is a state in which only the upper movable plate 10 is tilted with respect to the first lower movable plate 12. In other words, the first tilted state is a state in which the upper movable plate 10 is rotated in the positive direction at the tilt angle θ1.

In addition, in the second tilted state, for example, by expanding the second expansion/contraction bag 31, the intermediate movable plate 11 is rotated around the axis of the first lower rotation shaft 21 (see FIG. 3), and the upper movable plate 10 is rotated around the axis of the first connecting rotation shaft 22 (see FIG. 3). Besides, in the second tilted state, the angle between the upper movable plate 10 and the intermediate movable plate 11 is kept unchanged by not expanding the first expansion/contraction bag 30. In addition, the first lower movable plate 12 is not rotated even in the second tilted state. That is, the second tilted state is a state in which the upper movable plate 10 and the intermediate movable plate 11 are tilted with respect to the first lower movable plate 12. In other words, the second tilted state is a state in which the upper movable plate 10 rotates in the negative direction at the tilt angle θ1 and the intermediate movable plate 11 also rotates in the negative direction at the tilt angle θ1.

(Tilting of Movable Plate Toward Unintended Direction)

Here, in the embodiment, by arranging the first connecting member 40, the object T to be tilted (see FIG. 1) is configured so as not to be tilted unintentionally even if the object T to be tilted is arranged at the end portion 10*a* (FIG. 6) of the upper movable plate 10 opposite to the upper rotation shaft 20.

Figure 17:
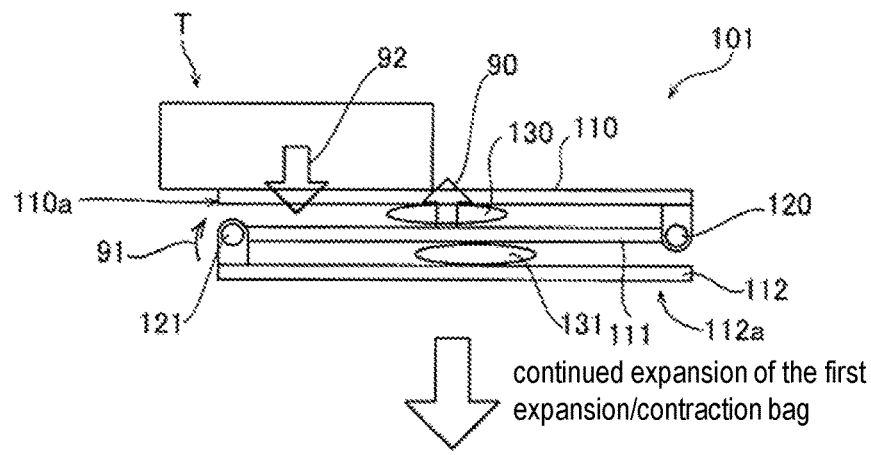
FIG. 17 is a diagram for illustrating an example in which a movable plate is tilted in an unintended direction in a tilting device according to a comparative example.
Figure 17:
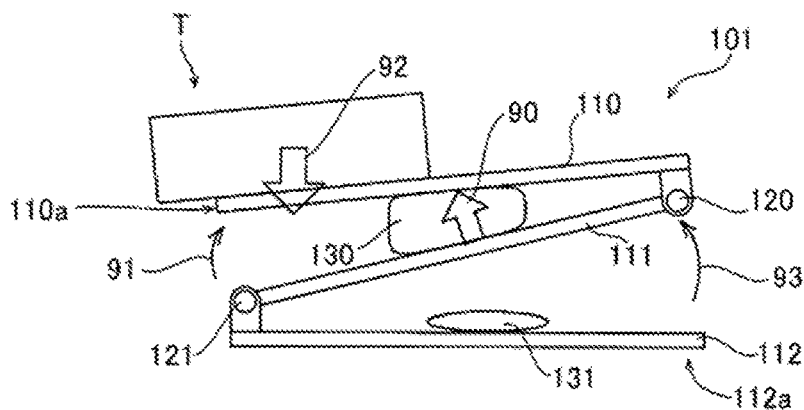
Figure 17:
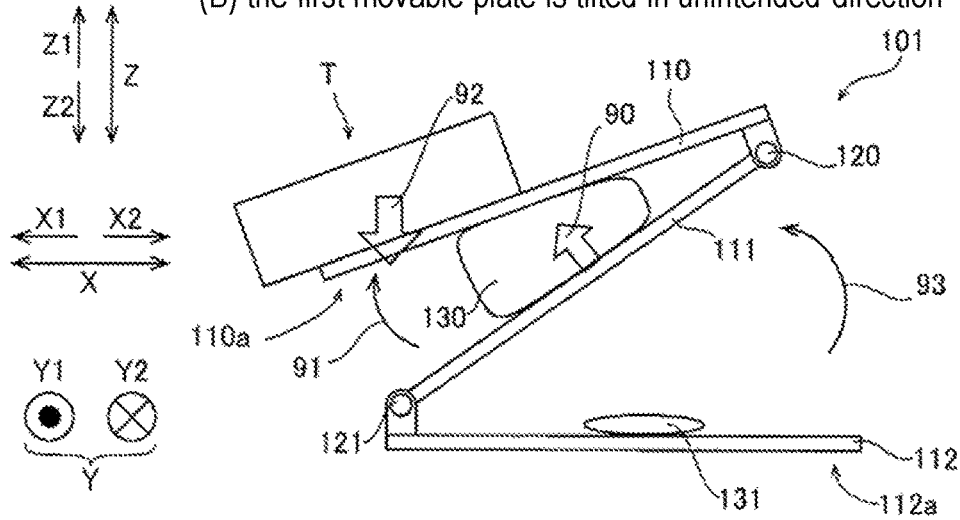

First, with reference to FIG. 17, a configuration in which an unintended tilting occurs in a movable portion 101 of a comparative example is described. The movable portion 101 of the comparative example shown in FIG. 17 includes an upper movable plate 110, an intermediate movable plate 111, and a first lower movable plate 112. The upper movable plate 110 and the intermediate movable plate 111 according to the comparative example are connected to each other via an upper rotation shaft 120. In addition, the intermediate movable plate 111 and the first lower movable plate 112 according to the comparative example are connected to each other via a first lower rotation shaft 121.

In addition, in the movable portion 101 according to the comparative example, a first expansion/contraction bag 130 is arranged between the upper movable plate 110 and the intermediate movable plate 111. Besides, in the movable portion 101 according to the comparative example, a second expansion/contraction bag 131 is arranged between the intermediate movable plate 111 and the first lower movable plate 112. The movable portion 101 according to the comparative example is configured to enable the upper movable plate 110 and the intermediate movable plate 111 to be rotated by the expansion and contraction of the first expansion/contraction bag 130 and the second expansion/contraction bag 131. Because the movable portion 101 according to the comparative example has the same configuration as the movable portion 1 according to the first embodiment except that the first connecting member 40 is not included, detailed description thereof is omitted.

In the comparative example, it is assumed that the upper movable plate 110 is rotated around the axis of the upper rotation shaft 120 and the upper movable plate 110 is tilted by expanding the first expansion/contraction bag 130. In the comparative example, as shown in FIG. 17(A), the expansion of the first expansion/contraction bag 130 is started in a state that the object T to be tilted is arranged at an end portion 110*a* of the upper movable plate 110 opposite to the rotation shaft (the upper rotation shaft 120). When the expansion of the first expansion/contraction bag 130 is started, a force in the Z1 direction is applied to the upper movable plate 110 as shown by an arrow 90. Because the upper movable plate 110 is connected to the intermediate movable plate 111 via the upper rotation shaft 120, when the force in the Z1 direction is applied to the upper movable plate 110, a momentum centered on the rotation shaft 120 in the clockwise direction in the figure is generated as shown by an arrow 91.

Here, as shown in FIG. 17(A), due to the own weight of the object T to be tilted, a force is applied from the object T to be tilted to the upper movable plate 110 in the direction indicated by an arrow 92. In the comparative example, because the upper movable plate 110 is not connected to the first lower movable plate 112, the movement of the end portion 110*a* of the upper movable plate 110 on the X1 direction side is not restricted, and the upper movable plate 110 is freely rotated around the upper rotation shaft 120. In addition, because the movement of the end portion 110*a* of the upper movable plate 110 is not restricted, the upper rotation shaft 120 may also move along with the movement of the end portion 110*a* of the upper movable plate 110. Thus, when the upper movable plate 110 rotates around the axis of the upper rotation shaft 120, a distance between the end portion 110*a* of the upper movable plate 110 and an end portion 113*a* of the first lower movable plate 112 on the X2 direction side may change. When the object T to be tilted is arranged at the end portion 110*a* of the upper movable plate 110 opposite to the rotation shaft (the upper rotation shaft 120), a momentum centered on the first lower rotation shaft 121 in the counterclockwise rotation direction in the figure is generated with respect to a structure constituted of the upper movable plate 110, the intermediate movable plate 111, the first lower movable plate 112, and the first expansion/contraction bag 130, as shown by an arrow 93 in FIG. 17(B).

As shown in FIG. 17(C), when the expansion of the first expansion/contraction bag 130 is continued in a state that a momentum is generated in the direction indicated by the arrow 93, the momentum of rotation in the counterclockwise direction in the figure, that is, in the direction along the arrow 93, may be larger than the momentum of rotation of the upper movable plate 110 in the clockwise direction in the figure, that is, in the direction along the arrow 91, which is caused by the first expansion/contraction bag 130. In this case, the upper movable plate 110 rotates around the axis of the first lower rotation shaft 121 in the direction along the arrow 93, not in the direction along the arrow 91. That is, the upper movable plate 110 is tilted in an unintended direction.

(Suppression of Tilt Toward Unintended Direction)

Figure 18:
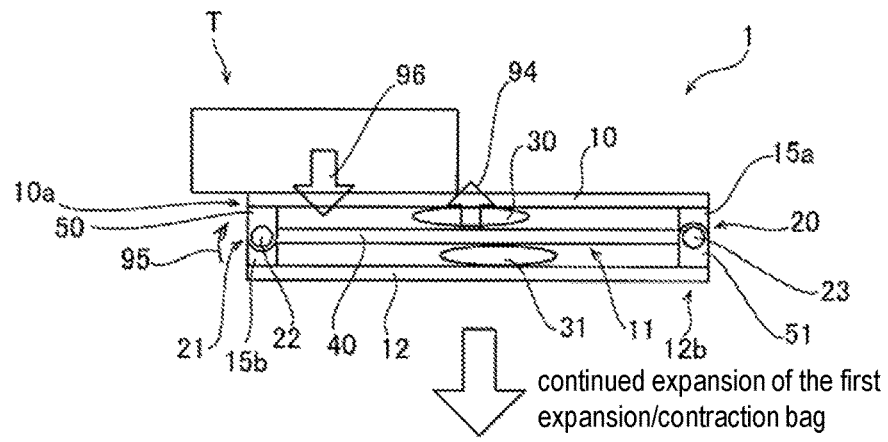
FIG. 18 is a diagram for illustrating a configuration in which tilting of the movable plate in an unintended direction is suppressed in the tilting device according to the first embodiment.
Figure 18:
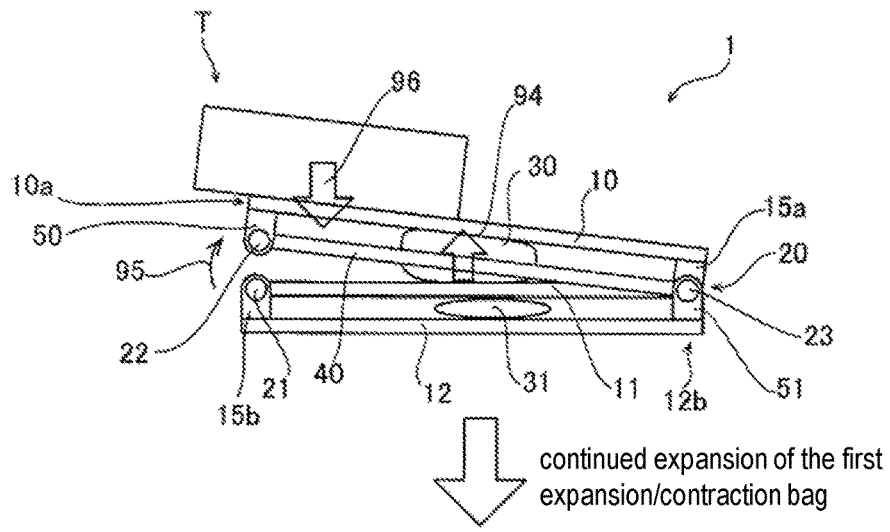
Figure 18:
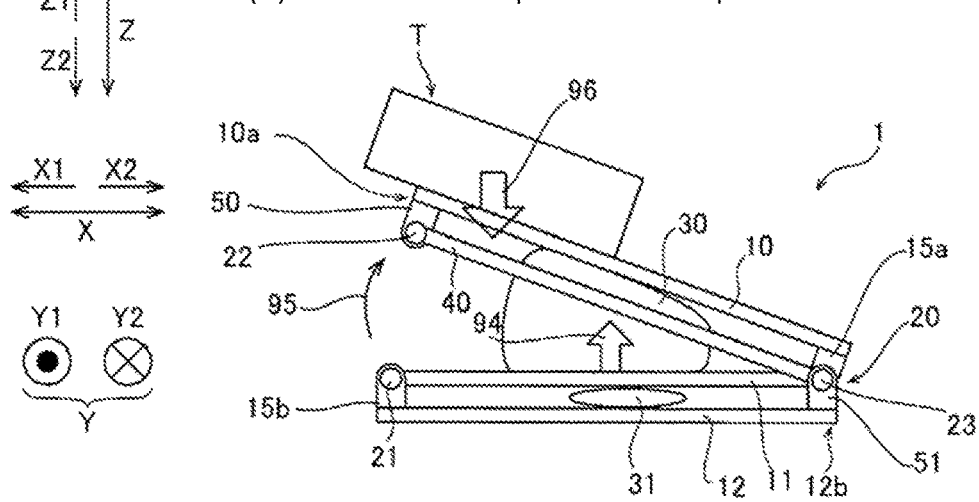

Next, with reference to FIG. 18, a configuration in which the movable portion 1 according to the first embodiment rotates the upper movable plate 10 is described. Also, in the example shown in FIG. 18, by expanding the first expansion/contraction bag 30, the upper movable plate 10 is rotated around the axis of the upper rotation shaft 20 and the upper movable plate 10 is tilted.

As shown in FIG. 18(A), when the expansion of the first expansion/contraction bag 30 is started, a force in the direction along the arrow 94 is applied to the upper movable plate 10 from the first expansion/contraction bag 30, and a momentum in the clockwise direction in the figure is generated in the direction along an arrow 95. That is, the upper movable plate 10 starts rotating around the axis of the upper rotation shaft 20. Also, in this case, as shown by an arrow 96, a force caused by the own weight of the object T to be tilted is applied to the upper movable plate 10. Here, in the first embodiment, the upper movable plate 10 and the first lower movable plate 12 are connected by the first connecting member 40. Therefore, the movement of the end portion 10a of the upper movable plate 10 is restricted by the first connecting member 40. In addition, because the movement of the end portion 10a of the upper movable plate 10 is restricted by the first connecting member 40, the movement of the upper rotation shaft 20 is also restricted.

Therefore, as shown in FIG. 18(B), in the movable portion 1 according to the first embodiment, a distance between the end portion 10a of the upper movable plate 10 and the end portion 12a of the first lower movable plate 12 on the X2 direction side does not change even when the expansion of the first expansion/contraction bag 30 is continued. Thus, no momentum of rotation around the axis of the first lower rotation shaft 21 is generated with respect to the upper movable plate 10. Therefore, as shown in FIG. 18(C), the upper movable plate 10 can be tilted to a desired angle without tilting toward an unintended direction even when the expansion of the first expansion/contraction bag 30 is continued.

(Movement Restriction by First Connecting Member)

Figure 19:
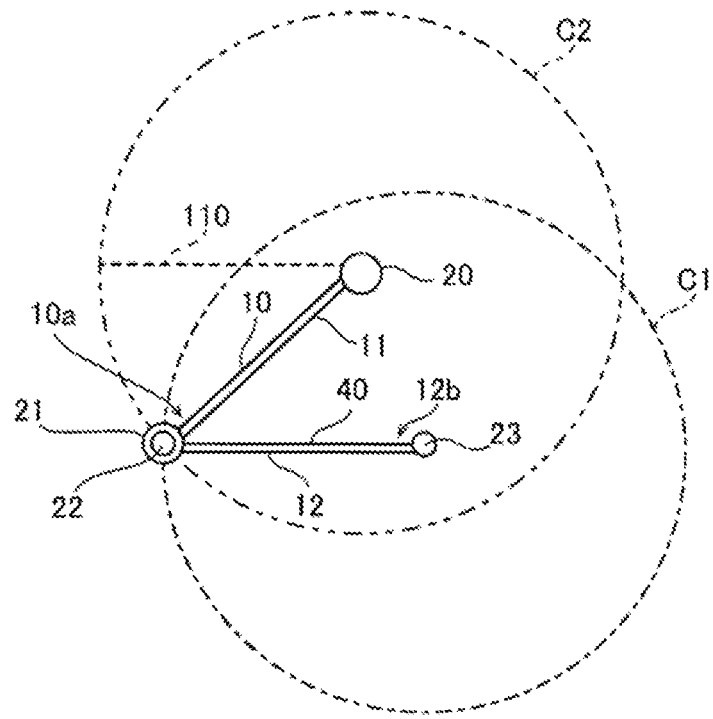
FIG. 19 is a schematic view for illustrating a configuration in which the movement of the upper movable plate is restricted by the first connecting member in the tilting device according to the first embodiment.

As shown in FIG. 19, the first connecting member 40 can move on a circle C1 centered on the second connecting rotation shaft 23 by rotating around the axis of the second connecting rotation shaft 23. In addition, the upper movable plate 10 can move on a circle C2 centered on the upper rotation shaft 20 by rotating around the axis of the upper rotation shaft 20.

In the first embodiment, by connecting the upper movable plate 10 and the first lower movable plate 12 using the first connecting member 40, the end portion 10a of the upper movable plate 10 is restricted from moving to the position of the intersection of the circle C1 and the circle C2. That is, in the first embodiment, the distance between the end portion 10a of the upper movable plate 10 and the end portion 12b of the first lower movable plate 12 is the radius of the circle C1 and does not change. In other words, the distance between the end portion 10a of the upper movable plate 10 and the end portion 12b of the first lower movable plate 12 is restricted by the length of the first connecting member 40 and does not change. In order to prevent the upper movable plate 10 from accidentally opening, the end portion 10a of the upper movable plate 10 need be restricted to the position of the first lower rotation shaft 21 so as not to move on the circle C2.

On the other hand, similar to the upper movable plate 110 according to the comparative example, when the first connecting member 40 is not arranged, the upper movable plate 110 can move freely on the circle C2, and thus the distance between the end portion 110a (see FIG. 17) of the upper movable plate 110 and an end portion 112a (see FIG. 17) of the first lower movable plate 112 may change. Moreover, in FIG. 19, the upper movable plate 110 according to the comparative example is shown by a broken line.

(Arrangement of Each Rotation Shaft)

Here, when the upper movable plate 10 rotates around the axis of the upper rotation shaft 20, the first connecting member 40 also rotates in the same direction as the upper movable plate 10. When the rotation center of the upper movable plate 10 is deviated from the rotation center of the first connecting member 40, at least one of the upper movable plate 10 and the first connecting member 40 may be deformed. Therefore, in the first embodiment, the first connecting rotation shaft 22 of the first connecting member 40 and the upper movable plate 10 is arranged substantially coaxially with the first lower rotation shaft 21 of the intermediate movable plate 11 and the first lower movable plate 12. Moreover, in the first embodiment, when the first expansion/contraction bag 30 is in a contracted state, the first lower rotation shaft 21 is arranged substantially coaxially with the first connecting rotation shaft 22.

In addition, when the intermediate movable plate 11 rotates around the axis of the first connecting rotation shaft 22, the upper movable plate 10 also rotates together with the intermediate movable plate 11 around the axis of the first connecting rotation shaft 22. At this time, the first connecting member 40 does not rotate. When the first connecting rotation shaft 22 is not arranged substantially coaxially with the second connecting rotation shaft 23, at least one of the upper movable plate 10 and the first connecting member 40 may be deformed. Therefore, in the first embodiment, the second connecting rotation shaft 23 of the first connecting member 40 and the first lower movable plate 12 is arranged substantially coaxially with the upper rotation shaft 20 of the upper movable plate 10 and the intermediate movable plate 11. Moreover, in the first embodiment, when the second expansion/contraction bag 31 is in a contracted state, the upper rotation shaft 20 is arranged substantially coaxially with the second connecting rotation shaft 23.

(Allowable Range of Error of Rotation Shaft)

Figure 20:
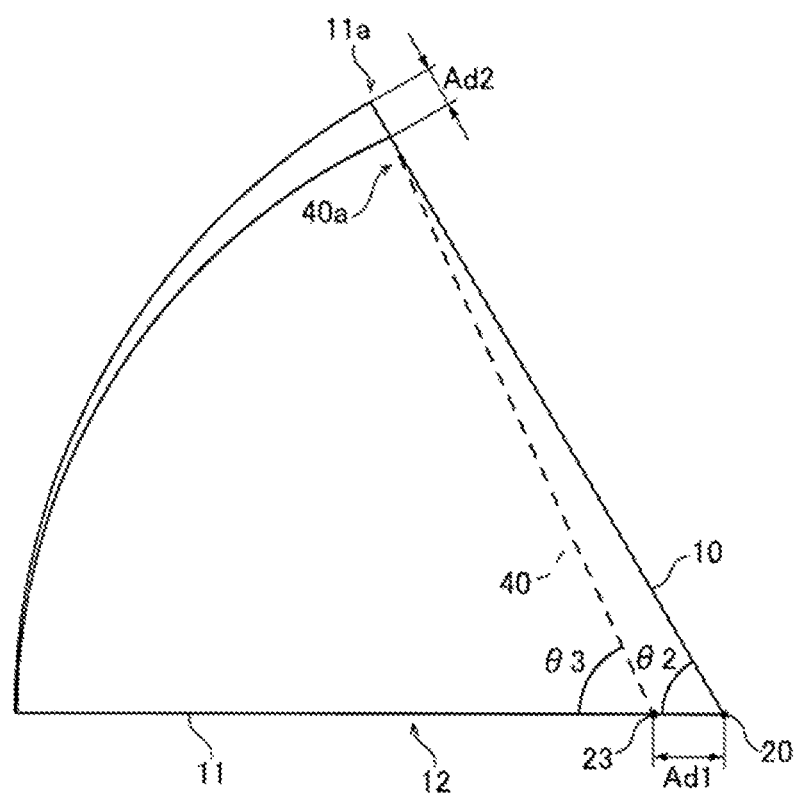
FIG. 20 is a schematic diagram for illustrating an allowable range of an error in positions of the upper rotation shaft and a second connecting rotation shaft.

Next, with reference to FIG. 20, description is made on an error of the position where each rotation portion is arranged. Moreover, in FIG. 20, an allowable range of the positional deviation between the upper rotation shaft 20 and the second connecting rotation shaft 23 is described. An allowable range of the positional deviation between the first lower rotation shaft 21 and the first connecting rotation shaft 22 is the same as the allowable range of the positional deviation between the upper rotation shaft 20 and the second connecting rotation shaft 23, and thus the detailed description thereof is omitted.

The example shown in FIG. 20 shows a state in which the position of the upper rotation shaft 20 is deviated from the position of the second connecting rotation shaft 23 by a distance Ad1. In addition, the example shown in FIG. 20 shows a case in which the upper movable plate 10 is rotated at an angle θ2. Additionally, the example shown in FIG. 20 shows a case in which the first connecting member 40 is rotated at an angle θ3.

When the upper movable plate 10 and the first connecting member 40 are rotated in a state that the position of the upper rotation shaft 20 is deviated from the position of the second connecting rotation shaft 23 by the distance Ad1, the end portion 10a of the upper movable plate 10 is deviated from the end portion 40a of the first connecting member 40 by a distance Ad2. Specifically, a positional deviation occurs such that the first connecting member 40 is shorter than the upper movable plate 10 by the distance Ad2. However, in the first embodiment, because the upper movable plate 10 is connected to the first connecting member 40, the upper movable plate 10 and the first connecting member 40 do not rotate if the upper movable plate 10 is deformed by bending or the first connecting member 40 is not deformed by extension.

Here, the angle θ2 at which the upper movable plate 10 rotates, the angle θ3 at which the first connecting member 40 rotates, and the distance Ad2 are changed depending on the distance Ad1 which is an amount of deviation between the upper rotation shaft 20 and the first connecting rotation shaft 22. The distance Ad2 also increases with the increase of the angle θ2 and the angle θ3, but this ratio is constant with respect to the distance Ad1. In addition, the distance Ad2 can be regarded as the sum of the tolerances when the first connecting member 40 is arranged on the first connecting rotation shaft 22 and the second connecting rotation shaft 23. Besides, the distance Ad1 can be regarded as an allowable range of the amount of deviation of the upper rotation shaft 20 from the rotation shaft. Thus, when an opening angle (the angle θ2 and the angle θ3) is 45 degrees, an arrangement in which the distance Ad1 is 4 times or less as long as the distance Ad2 with respect to the sum of the tolerances of the rotation centers at both ends of the first connecting member 40 (the distance Ad2) can be regarded as an arrangement in which the upper rotation shaft 20 is arranged substantially coaxially with the first connecting rotation shaft 22. That is, when the opening angle is 45 degrees, the allowable range of the distance Ad1 is preferably 4 times or less as long as the distance Ad2.

In addition, when the opening angle (the angle θ2 and the angle θ3) is 60 degrees, an arrangement in which the distance Ad1 is twice or less as long as the distance Ad2 with respect to the sum of the tolerances of the rotation centers at both ends of the first connecting member 40 (the distance Ad2) can be regarded as an arrangement in which the upper rotation shaft 20 is arranged substantially coaxially with the first connecting rotation shaft 22. That is, when the opening angle is 60 degrees, the allowable range of the distance Ad1 is preferably twice or less as long as the distance Ad2. In addition, when the opening angle (the angle θ2 and the angle θ3) is 90 degrees, an arrangement in which the distance Ad1 is equal to or less than the distance Ad2 with respect to the sum of the tolerances of the rotation centers at both ends of the first connecting member 40 (the distance Ad2) can be regarded as an arrangement in which the upper rotation shaft 20 is arranged substantially coaxially with the first connecting rotation shaft 22. That is, when the opening angle is 90 degrees, the allowable range of the distance Ad1 is preferably equal to or less than the distance Ad2.

(Flow Passage Switching Portion)

Figure 21:
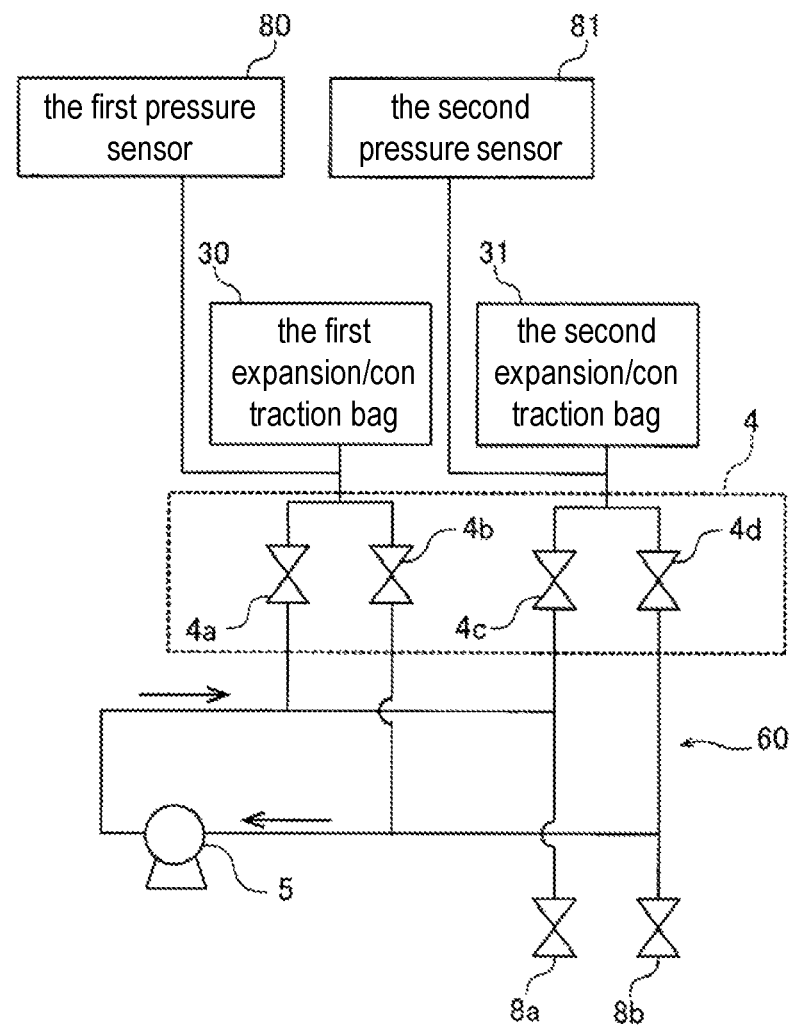
FIG. 21 is a block diagram of a flow passage switching unit of the tilting device according to the first embodiment.

In the first embodiment, as shown in FIG. 21, the pump 5 for the intake/exhaustion of air to/from the first expansion/contraction bag 30 and the second expansion/contraction bag 31 is arranged on the flow passage 60 of air. In addition, a flow passage switching unit 4, a flow passage gas supply solenoid valve 8a, and a flow passage exhaust solenoid valve 8b are arranged on the flow passage 60 for the intake/exhaustion of air to/from each expansion/contraction bag. Moreover, the flow passage gas supply solenoid valve 8a is a solenoid valve that is opened when air is supplied in the flow passage 60, and the flow passage exhaust solenoid valve 8b is a solenoid valve that is opened when air is exhausted in the flow passage 60.

In addition, the flow passage switching unit 4 is constituted of a first gas supply solenoid valve 4a, a first exhaust solenoid valve 4b, a second gas supply solenoid valve 4c and a second exhaust solenoid valve 4d that are arranged on the flow passage 60 for the intake/exhaustion of air to/from each expansion/contraction bag. As for the solenoid valve, an exhaust solenoid valve for exhausting gas from each expansion/contraction bag and a gas supply solenoid valve for supplying gas to each expansion/contraction bag are arranged in each flow passage 60. The first gas supply solenoid valve 4a is a solenoid valve that is opened when air is supplied to the first expansion/contraction bag 30, and the first exhaust solenoid valve 4b is a solenoid valve that is opened when air is exhausted from the first expansion/contraction bag 30. In addition, the second gas supply solenoid valve 4c is a solenoid valve that is opened when air is supplied to the second expansion/contraction bag 31, and the second exhaust solenoid valve 4d is a solenoid valve that is opened when air is exhausted from the second expansion/contraction bag 31.

In addition, in the first embodiment, the control unit 3 individually controls the intake/exhaustion of air to/from the first expansion/contraction bag 30 and the second expansion/contraction bag 31 by controlling the pump 5 and the opening/closing of each solenoid valve arranged on the flow passage 60. In addition, these controls are performed by the control unit 3 in a manner of tilting the upper movable plate 10 based on the tilt angle θ1 (see FIG. 16) detected by each angle sensor as described above.

Besides, in the first embodiment, the control unit 3 is configured to perform control in a manner to stop the supply of gas (air) to the first expansion/contraction bag 30 and the second expansion/contraction bag 31 when the tilt angle θ1 (see FIG. 16) measured by the first angle sensor 70 becomes a predetermined angle.

In addition, in the first embodiment, pressure sensors (the first pressure sensor 80 and the second pressure sensor 81) for individually measuring the pressure in each expansion/contraction bag are arranged between each expansion/contraction bag and each solenoid valve. The control unit 3 is configured to perform control in a manner to stop supply of gas (air) to the first expansion/contraction bag 30 when the pressure inside the first expansion/contraction bag 30 measured by the first pressure sensor 80 exceeds a predetermined first upper limit value, and stop supply of gas (air) to the second expansion/contraction bag 31 when the pressure inside the second expansion/contraction bag 31 measured by the second pressure sensor 81 exceeds a predetermined second upper limit value.

When the movable portion 1 is rotated in the positive direction, the control unit 3 first opens only the second exhaust solenoid valve 4d and the flow passage exhaust solenoid valve 8b. Next, the control unit 3 drives the pump 5 to exhaust all the air in the second expansion/contraction bag 31. Further, the control unit 3 may detect that the entire amount of air has been exhausted when it detects that the pressure of the second pressure sensor 81 becomes a negative pressure. Next, the control unit 3 opens only the first gas supply solenoid valve 4a and the flow passage gas supply solenoid valve 8a. After that, the control unit 3 drives the pump 5 until the tilt angle θ1 of the upper movable plate 10 detected by the first angle sensor 70 becomes a desired angle, and supplies air to the first expansion/contraction bag 30. Subsequently, the control unit 3 performs control in a manner closing all the valves. Accordingly, the rotation of the movable portion 1 toward the positive direction is completed.

In addition, when the movable portion 1 is rotated in the negative direction, the control unit 3 first opens only the first exhaust solenoid valve 4b and the flow passage exhaust solenoid valve 8b. Next, the control unit 3 drives the pump 5 to exhaust all the air from the first expansion/contraction bag 30. Further, the control unit 3 may detect that the entire amount of air has been exhausted when it detects that the pressure of the first pressure sensor 80 becomes a negative pressure. Next, the control unit 3 opens only the second gas supply solenoid valve 4c and the flow passage gas supply solenoid valve 8a. After that, the control unit 3 drives the pump 5 until the tilt angle θ1 of the upper movable plate 10 detected by the first angle sensor 70 becomes a desired angle, and supplies air to the second expansion/contraction bag 31. Subsequently, the control unit 3 performs control in a manner of closing all the valves. Accordingly, the rotation of the movable portion 1 toward the negative direction is completed.

Besides, in the first embodiment, the tilting device 100 is configured to include the first connecting member 40 so that the first expansion/contraction bag 30 and the second expansion/contraction bag 31 do not expand at the same time (that is, the upper movable plate 10 does not rise). Thus, a pressure abnormality can be detected even if one of the expansion/contraction bags is not completely exhausted and the other expansion/contraction bag is supplied with air due to a malfunction of at least one of the flow passage switching unit 4 and the pump 5. The reason is that the expansion of the expansion/contraction bag is mechanically restricted, and when air is supplied to the other expansion/contraction bag, the pressure rises rapidly. In addition, when a pressure abnormality is detected, the control unit 3 can safely stop the supply of gas by performing control to stop the pump 5.

(Abnormality Detection Processing)

Figure 22:
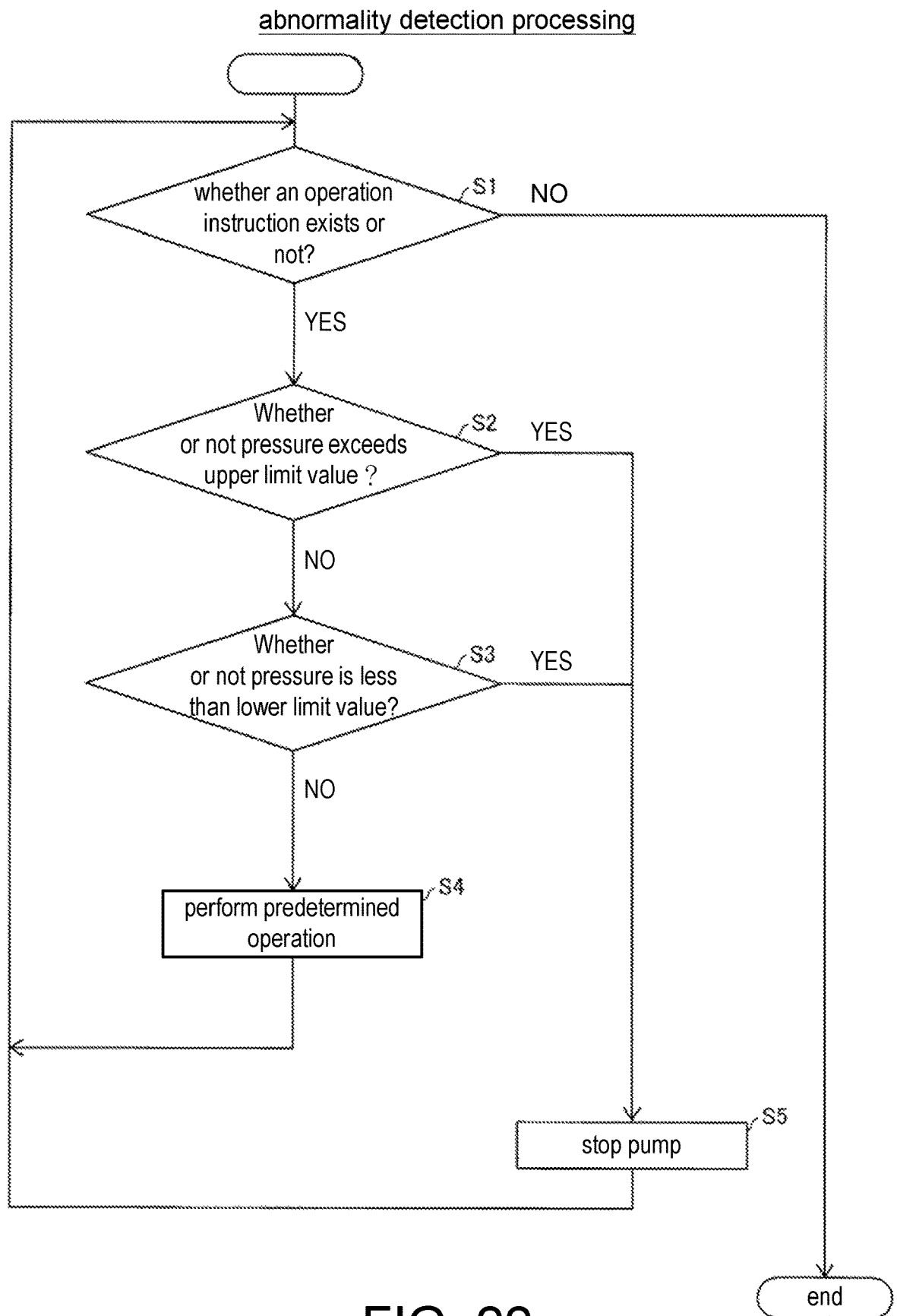
FIG. 22 is a flowchart of abnormality detection processing control by a control unit of the tilting device of the first embodiment.

Next, an example of abnormality detection processing by the control unit 3 of the tilting device 100 of the first embodiment is described with reference to FIG. 22 based on a flowchart.

In step S1, the control unit 3 determines whether or not an operation instruction exists. When an operation instruction is transmitted from the communication unit 6 or the operation unit 7 to the control unit 3, the processing proceeds to step S2. Alternatively, the processing is ended when there is no operation instruction.

In step S2, the control unit 3 determines whether or not the pressure in each expansion/contraction bag exceeds the upper limit value. The control unit 3 determines whether or not the pressure in the expansion/contraction bag exceeds the upper limit value based on a measurement result obtained from each pressure sensor (the first pressure sensor 80 and the second pressure sensor 81) individually arranged on the flow passage 60 of each expansion/contraction bag (the first expansion/contraction bag 30 and the second expansion/contraction bag 31). When the pressure in any one of the first expansion/contraction bag 30 and the second expansion/contraction bag 31 exceeds the upper limit value, the processing proceeds to step S5. Alternatively, the processing proceeds to step S3 when the pressures in all the expansion/contraction bags do not exceed the upper limit value.

In step S3, the control unit 3 determines whether or not the pressure in each expansion/contraction bag is less than a lower limit value. The control unit 3 determines whether or not the pressure in each expansion/contraction bag is less than the lower limit value based on the measurement results obtained from each pressure sensor individually arranged on the flow passage of each expansion/contraction bag. If the pressure in any one of the expansion/contraction bags is less than the lower limit value, the processing proceeds to step S5. Alternatively, the processing proceeds to step S4 when the pressure in all the expansion/contraction bags is not less than the lower limit value.

In step S4, the control unit 3 performs a predetermined operation. The predetermined operation is an operation based on the operation instruction transmitted from the communication unit 6 to the control unit 3 or an operation of the operation unit 7. The control unit 3 controls the flow passage switching unit 4 and the pump 5 based on the given operation instruction or the operation of the operation unit 7 in a manner of obtaining the desired tilt angle θ1, and supplies and exhausts air to and from each expansion/contraction bag. After the predetermined operation is completed, the processing returns to step S1.

In step S5, the control unit 3 stops the pump 5. After the pump 5 is stopped, the processing returns to step S1. Note that, either the processing of step S2 or the processing of step S3 may be executed first.

(Effect of First Embodiment)

In the first embodiment, the following effects can be obtained.

In the first embodiment, as described above, the tilting device 100 includes: the upper movable plate 10 arranged on a side on which the object T to be tilted is arranged; the intermediate movable plate 11 arranged below the upper movable plate 10 and connected to the upper movable plate 10 in a rotatable manner via the upper rotation shaft 20; the first actuator arranged between the upper movable plate 10 and the intermediate movable plate 11; the first lower movable plate 12 arranged below the intermediate movable plate 11 and connected to the intermediate movable plate 11 in a rotatable manner via the first lower rotation shaft 21; the second actuator arranged between the intermediate movable plate 11 and the first lower movable plate 12; and the first connecting member 40 that is connected to the upper movable plate 10 in a rotatable manner via the first connecting rotation shaft 22 at the end portion 10a on the first direction side opposite to the end portion 10b at which the upper movable plate 10 is connected to the intermediate movable plate 11, and that is connected to the first lower movable plate 12 in a rotatable manner via the second connecting rotation shaft 23 at the end portion 12b on the second direction side opposite to the first direction.

Here, when the upper movable plate 10 is rotated around the axis of the upper rotation shaft 20 of the upper movable plate 10 and the intermediate movable plate 11, the first connecting member 40 rotates integrally with the upper movable plate 10 around the axis of the second connecting rotation shaft 23 of the first connecting member 40 and the first lower movable plate 12. Therefore, the first connecting member 40 is configured to be connected to the upper movable plate 10 via the first connecting rotation shaft 22. Accordingly, when the upper movable plate 10 is tilted by rotating the upper movable plate 10 in a rotation direction around the upper rotation shaft 20, the movement of the upper rotation shaft 20 of the upper movable plate 10 can be restricted by the first connecting member 40 that is connected to the upper movable plate 10 via the first connecting rotation shaft 22 even in a case that the object T to be tilted is arranged at the end portion 10a opposite to the upper rotation shaft 20. Consequently, occurrence of a momentum in an unintended direction in the upper movable plate 10 due to the own weight of the object T to be tilted can be suppressed, and thus it is possible to provide the tilting device 100 that can suppress tilting of the movable plate in an unintended direction due to the arrangement of the object T to be tilted when the tilting device 100 is tilted.

In addition, in the first embodiment, as described above, the first connecting rotation shaft 22 of the first connecting member 40 and the upper movable plate 10 is arranged substantially coaxially with the first lower rotation shaft 21 of the intermediate movable plate 11 and the first lower movable plate 12, and the second connecting rotation shaft 23 of the first connecting member 40 and the first lower movable plate 12 is arranged substantially coaxially with the upper rotation shaft 20 of the upper movable plate 10 and the intermediate movable plate 11. Here, when the intermediate movable plate 11 is rotated around the axis of the first lower rotation shaft 21 of the intermediate movable plate 11 and the first lower movable plate 12, the upper movable plate 10 rotates integrally with the intermediate movable plate 11 around the axis of the first connecting rotation shaft 22 of the first connecting member 40 and the upper movable plate 10. In this case, if the first lower rotation shaft 21 is not arranged substantially coaxially with the first connecting rotation shaft 22, a deviation occurs between the rotation center of the upper movable plate 10 and the rotation center of the intermediate movable plate 11. If a deviation occurs between the rotation center of the upper movable plate 10 and the rotation center of the intermediate movable plate 11, the upper movable plate 10 cannot rotate integrally with the intermediate movable plate 11.

In addition, when the upper movable plate 10 is rotated around the axis of the upper rotation shaft 20 of the upper movable plate 10 and the intermediate movable plate 11, a deviation occurs between the rotation center of the upper movable plate 10 and the rotation center of the first connecting member 40 if the upper rotation shaft 20 is not arranged substantially coaxially with the second connecting rotation shaft 23. If a deviation occurs between the rotation center of the upper movable plate 10 and the rotation center of the first connecting member 40, the upper movable plate 10 cannot rotate integrally with the first connecting member 40.

Therefore, if the first connecting rotation shaft 22 is arranged substantially coaxially with the first lower rotation shaft 21 as described above, occurrence of a deviation between the first connecting rotation shaft 22 and the first lower rotation shaft 21 can be suppressed. Consequently, when the intermediate movable plate 11 is rotated around the axis of the first lower rotation shaft 21, the intermediate movable plate 11 can be suppressed from being unable to rotate. In addition, if the upper rotation shaft 20 is arranged substantially coaxially with the second connecting rotation shaft 23, generation of a deviation between the upper rotation shaft 20 and the second connecting rotation shaft 23 can be suppressed. Consequently, when the upper movable plate 10 is rotated around the axis of the upper rotation shaft 20, the upper movable plate 10 can be suppressed from being unable to rotate.

In addition, in the first embodiment, as described above, the first connecting member 40 has a rod-like shape and is configured to extend in the direction intersecting the upper rotation shaft 20 and the first lower rotation shaft 21 in a plan view. Accordingly, because the first connecting member 40 is configured to extend in the direction intersecting the upper rotation shaft 20 and the first lower rotation shaft 21, it is possible to suppress the first connecting member 40 from interfering with the rotation of the upper movable plate 10 when the upper movable plate 10 rotates around the upper rotation shaft 20, and also it is possible to suppress the first connecting member 40 from interfering with the rotation of the intermediate movable plate 11 when the intermediate movable plate 11 rotates around the first lower rotation shaft 21.

In addition, in the first embodiment, as described above, the first connecting member 40 is arranged at the end portion 10$c$ of the upper movable plate 10 and the end portion 12$c$ of the first lower movable plate 12 in the third direction (Y1 direction) which is on one side of the direction orthogonal to the first direction and the second direction in a plan view. Accordingly, the first connecting member 40 can be arranged outside the upper rotation shaft 20 and the first lower rotation shaft 21 in the third direction. Consequently, as compared with a configuration in which the first connecting member 40 is arranged inside the upper rotation shaft 20 and the first lower rotation shaft 21 in the third direction, the intermediate movable plate 11 does not need to be provided with an opening or the like for passing the first connecting member 40, so that the complication of the configuration of the device can be suppressed.

In addition, in the first embodiment, as described above, the length of the upper movable plate 10 in the direction along the upper rotation shaft 20 is larger than the length of the intermediate movable plate 11 in the direction along the upper rotation shaft 20, and the length of the first lower movable plate 12 in the direction along the first lower rotation shaft 21 is larger than the length of the intermediate movable plate 11 in the direction along the first lower rotation shaft 21. The first connecting rotation shaft 22 is arranged on an end portion side of the upper movable plate 10 and more outward than the first lower rotation shaft 21 in the third direction, and the second connecting rotation shaft 23 is arranged on an end portion side of the first lower movable plate 12 and more outward than the upper rotation shaft 20 in the third direction. Accordingly, it is possible to suppress the first connecting member 40 from being arranged outside the upper movable plate 10 and the first lower movable plate 12 in a plan view even if the first connecting member 40 is arranged outside the upper rotation shaft 20 and first lower rotation shaft 21. Consequently, an increase in the size of the device can be suppressed.

In addition, in the first embodiment, as described above, the tilting device 100 further includes: the first protrusion 50 of the upper movable plate 10 that is arranged more outward than the first lower rotation shaft 21 in the third direction and protrudes downward from the upper movable plate 10 toward the first lower movable plate 12; and the second protrusion 51 of the first lower movable plate 12 that is arranged more outward than the upper rotation shaft 20 in the third direction and protrudes upward from the first lower movable plate 12 toward the upper movable plate 10. The first connecting rotation shaft 22 is arranged at the lower end portion 50$a$ of the first protrusion 50, and the second connecting rotation shaft 23 is arranged at the upper end portion 51$a$ of the second protrusion 51. Accordingly, because the first protrusion 50 protrudes downward, the first connecting rotation shaft 22 in the up-down direction can be arranged at substantially the same position as that of the first lower rotation shaft 21 by arranging the first connecting rotation shaft 22 at the lower end portion 50$a$ of the first protrusion 50. Consequently, the first lower rotation shaft 21 can be easily arranged substantially coaxially with the first connecting rotation shaft 22. In addition, because the second protrusion 51 protrudes upward, the second connecting rotation shaft 23 in the up-down direction can be arranged at substantially the same position as that of the upper rotation shaft 20 by arranging the second connecting rotation shaft 23 at the upper end portion 51$a$ of the second protrusion 51. Consequently, the upper rotation shaft 20 can be easily arranged substantially coaxially with the second connecting rotation shaft 23.

In addition, in the first embodiment, as described above, the first actuator includes the first expansion/contraction bag 30 that can be expanded and contracted by supply and exhaustion of gas, and the second actuator includes the second expansion/contraction bag 31 that can be expanded and contracted by supply and exhaustion of gas. The tilting device 100 further includes the control unit 3 that controls adjustment of the tilt angle θ1 of the upper movable plate 10 by controlling supply/exhaustion of gas to/from the first expansion/contraction bag 30 and the second expansion/contraction bag 31. Accordingly, the tilt angle θ1 of the upper movable plate 10 can be adjusted by supplying/exhausting gas to/from the first expansion/contraction bag 30 and the second expansion/contraction bag 31, and thus the configuration of the tilting device 100 can be simplified.

In addition, in the first embodiment, as described above, the tilting device 100 further includes: the flow passage 60 for supplying/exhausting gas to/from the first expansion/contraction bag 30 and the second expansion/contraction bag 31; the flow passage switching unit 4 for switching the flow passage 60; and the pump 5 for supplying/exhausting gas to/from the first expansion/contraction bag 30 and the second expansion/contraction bag 31. The control unit 3 is configured to control the supply/exhaustion of gas to/from the first expansion/contraction bag 30 and the second expansion/contraction bag 31 by controlling the flow passage switching unit 4 and the pump 5. Accordingly, the expansion and contraction of the first expansion/contraction bag 30 and the second expansion/contraction bag 31 by a single pump 5 can be realized by switching the flow passage 60 of the gas using the flow passage switching unit 4. Consequently, complication and large scaling of the tilting device 100 due to an increase in the number of parts can be suppressed as compared with a configuration in which each of the first expansion/contraction bag 30 and the second expansion/contraction bag 31 is provided with a pump 5.

In addition, in the first embodiment, as described above, the tilting device 100 further includes the first angle sensor 70 for measuring the tilt angle θ1 at which the upper movable plate 10 is tilted, and the control unit 3 is configured to perform control in a manner to stop the supply/exhaust of gas to/from the first expansion/contraction bag 30 and the second expansion/contraction bag 31 when the tilt angle θ1 measured by the first angle sensor 70 becomes the predetermined angle. Accordingly, the gas supply can be stopped when the tilt angle θ1 becomes the predetermined angle, and thus the tilt angle θ1 can be suppressed from becoming equal to or greater than the predetermined angle. In addition, because the gas exhaust can be stopped when the tilt angle θ1 becomes the predetermined angle, the gas exhaust can be stopped when the upper movable plate 10 is returned to a horizontal state by setting the predetermined angle to, for example, 0 degree.

In addition, in the first embodiment, as described above, the tilting device 100 further includes the first pressure sensor 80 that measures pressure inside the first expansion/contraction bag 30, and the second pressure sensor 81 that measures pressure inside the second expansion/contraction bag 31, and the control unit 3 is configured to perform control in a manner to stop the gas supply to the first expansion/contraction bag 30 when the pressure inside the first expansion/contraction bag 30 measured by the first pressure sensor 80 exceeds the predetermined first upper limit value, and stop the gas supply to the second expansion/contraction bag 31 when the pressure inside the second expansion/contraction bag 31 measured by the second pressure sensor 81 exceeds the predetermined second upper limit value. Accordingly, excessive expansion of the first expansion/contraction bag 30 can be suppressed. In addition, excessive expansion of the second expansion/contraction bag 31 can also be suppressed.

Second Embodiment

Figure 23:
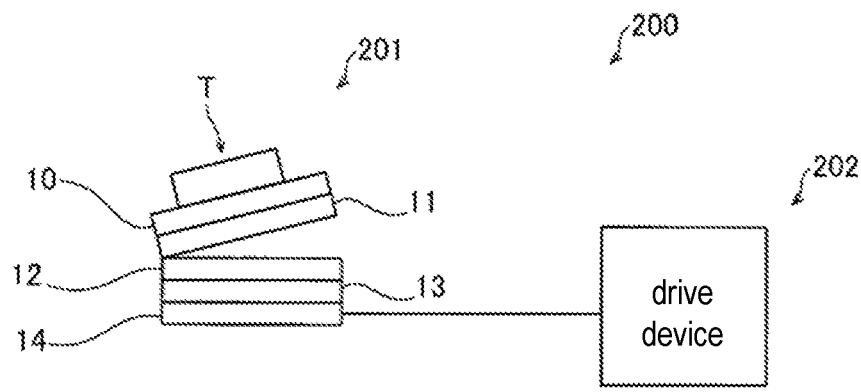
FIG. 23 is a diagram showing a configuration of a tilting device according to a second embodiment.

Next, a second embodiment is described with reference to FIGS. 23 to 26. As shown in FIG. 23, a tilting device 200 according to the second embodiment includes a movable portion 201 and a drive device 202. In addition, as shown in FIG. 23, the movable portion 201 includes the upper movable plate 10, the intermediate movable plate 11, the first lower movable plate 12, a second lower movable plate 13, and a third lower movable plate 14.

Figure 24:
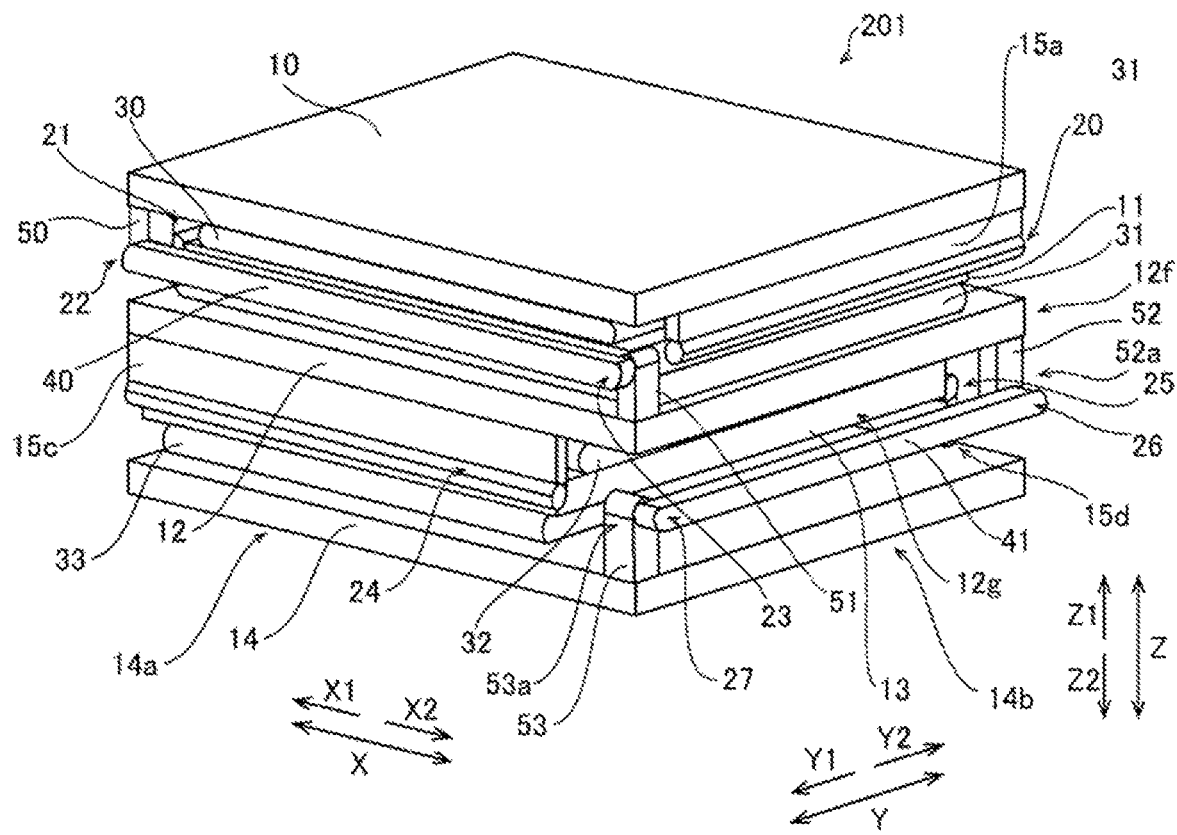
FIG. 24 is a perspective view of a movable portion according to the second embodiment.

As shown in FIG. 24, in addition to the configuration of the movable portion 1 according to the first embodiment, the movable portion 201 according to the second embodiment further includes the second lower movable plate 13, the third lower movable plate 14, a third expansion/contraction bag 32, a fourth expansion/contraction bag 33, a second connecting member 41, a third protrusion 52, and a fourth protrusion 53. Note that, the same parts as those in the first embodiment are designated by the same reference signs. In addition, the "third expansion/contraction bag 32" is an example of a "third actuator" in the claims, and the "fourth expansion/contraction bag 33" is an example of a "fourth actuator" in the claims.

As shown in FIG. 24, the second lower movable plate 13 is arranged below the first lower movable plate 12 and is connected to the first lower movable plate 12 in a rotatable manner via a second lower rotation shaft 24. In addition, the third lower movable plate 14 is arranged below the second lower movable plate 13 and is connected to the second lower movable plate 13 in a rotatable manner via a third lower rotation shaft 25. The second lower rotation shaft 24 and the third lower rotation shaft 25 include, for example, hinges and the like. Additionally, as shown in FIG. 24, the second lower rotation shaft 24 is arranged on the first lower movable plate 12 via a third spacer member 15c. Accordingly, the height position of the second lower rotation shaft 24 can be adjusted. In addition, the third lower rotation shaft 25 is arranged on the third lower movable plate 14 via a fourth spacer member 15d. Accordingly, the height position of the third lower rotation shaft 25 can be adjusted.

As shown in FIG. 24, the third expansion/contraction bag 32 is arranged between the first lower movable plate 12 and the second lower movable plate 13. In addition, the fourth expansion/contraction bag 33 is arranged between the second lower movable plate 13 and the third lower movable plate 14.

As shown in FIG. 24, the second connecting member 41 is connected to the first lower movable plate 12 in a rotatable manner via a third connecting rotation shaft 26 at an end portion 12f (an end portion on the Y2 direction side) on one side of a direction orthogonal to the first direction (Y direction) in a plan view, and is also connected to the third lower movable plate 14 in a rotatable manner via a fourth connecting rotation shaft 27 at an end portion 14a (an end portion on the Y1 direction side) on the other side of the direction orthogonal to the first direction (Y direction) in a plan view. The third connecting rotation shaft 26 and the fourth connecting rotation shaft 27 are constituted of, for example, a pin member (not shown) and a hole portion (not shown).

As shown in FIG. 24, the second connecting member 41 has a rod-like shape and is configured to extend in a direction (Y direction) intersecting the second lower rotation shaft 24 and the third lower rotation shaft 25 in a plan view. The second connecting member 41 is arranged at an end portion 12g of the first lower movable plate 12 and an end portion 14b of the third lower movable plate 14 in the second direction (X2 direction) in a plan view. That is, the second connecting member 41 is arranged in a manner of extending in a direction intersecting with the first connecting member 40. That is, the movable portion 201 according to the second embodiment has a configuration in which the mechanisms of the movable portion 1 according to the first embodiment are stacked in a plurality of stages by shifting the rotation shaft in phase.

In addition, as shown in FIG. 24, the third protrusion 52 is arranged at the end portion 12f of the first lower movable plate 12 on the Y2 direction side, and is configured to protrude downward toward the third lower movable plate 14. Additionally, the fourth protrusion 53 is arranged at the end portion 14a of the third lower movable plate 14 on the Y1 direction side, and is configured to protrude upward toward the first lower movable plate 12. The second connecting member 41 has an end portion 41a on one side (Y2 direction side) arranged at an end portion 52a on the lower side of the third protrusion 52, and an end portion 41b on the other side (Y1 direction side) arranged at an end portion 53a on the upper side of the fourth protrusion 53.

Figure 25:
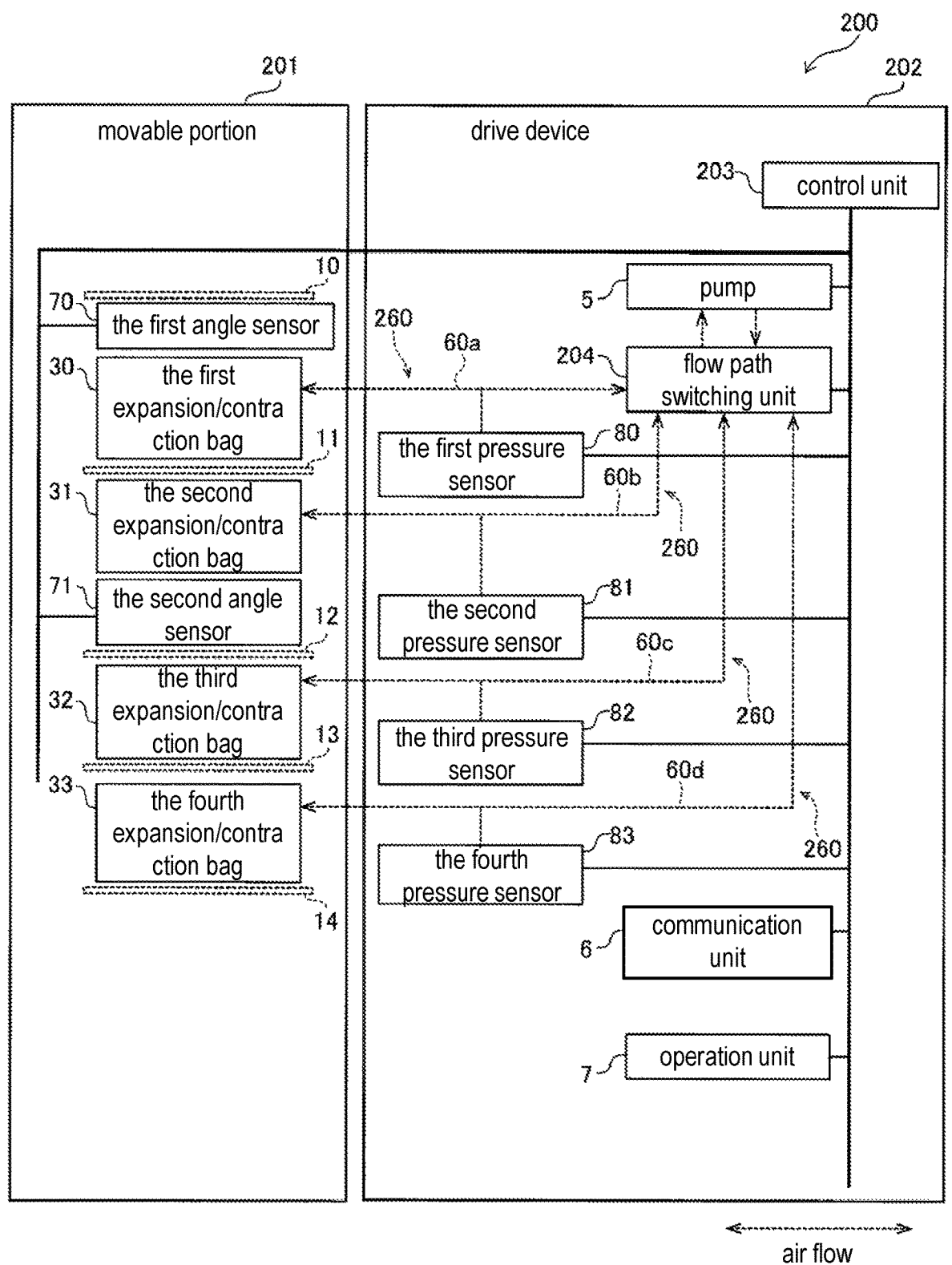
FIG. 25 is a block diagram of the tilting device according to the second embodiment.

As shown in FIG. 25, the movable portion 201 includes a second angle sensor 71 in addition to the first angle sensor 70. The second angle sensor 71 is a sensor for detecting the tilt angle of the first lower movable plate 12, and is arranged on the upper surface of the first lower movable plate 12. Further, the second angle sensor 71 is configured to be capable of detecting the direction of gravitational acceleration. The second angle sensor 71 includes, for example, an acceleration sensor that detects tilting of the sensor based on the acceleration.

In addition, as shown in FIG. 25, the configuration of the drive device 202 is different from the configuration of the drive device 2 according to the first embodiment in that the drive device 202 includes a control unit 203 and a flow passage switching unit 204 instead of the control unit 3 and the flow passage switching unit 4. Additionally, the tilting device 200 according to the second embodiment is different from the tilting device 100 according to the first embodiment in that the tilting device 200 includes a flow passage 260 instead of the flow passage 60.

The flow passage 260 includes a third flow passage 60c and a fourth flow passage 60d in addition to the first flow passage 60a and the second flow passage 60b. The third flow passage 60c is a flow passage connecting the third expansion/contraction bag 32 and the pump 5. In addition, the fourth flow passage 60d is a flow passage connecting the fourth expansion/contraction bag 33 and the pump 5.

The flow passage switching unit 204 is configured to switch among the first flow passage 60a, the second flow passage 60b, the third flow passage 60c, and the fourth flow passage 60d.

The control unit 203 is configured to control the supply/exhaustion of gas to/from the first expansion/contraction bag 30 to the fourth expansion/contraction bag 33 by controlling the flow passage switching unit 204 and the pump 5, thereby tilting the object T to be tilted (see FIG. 23).

Figure 26:
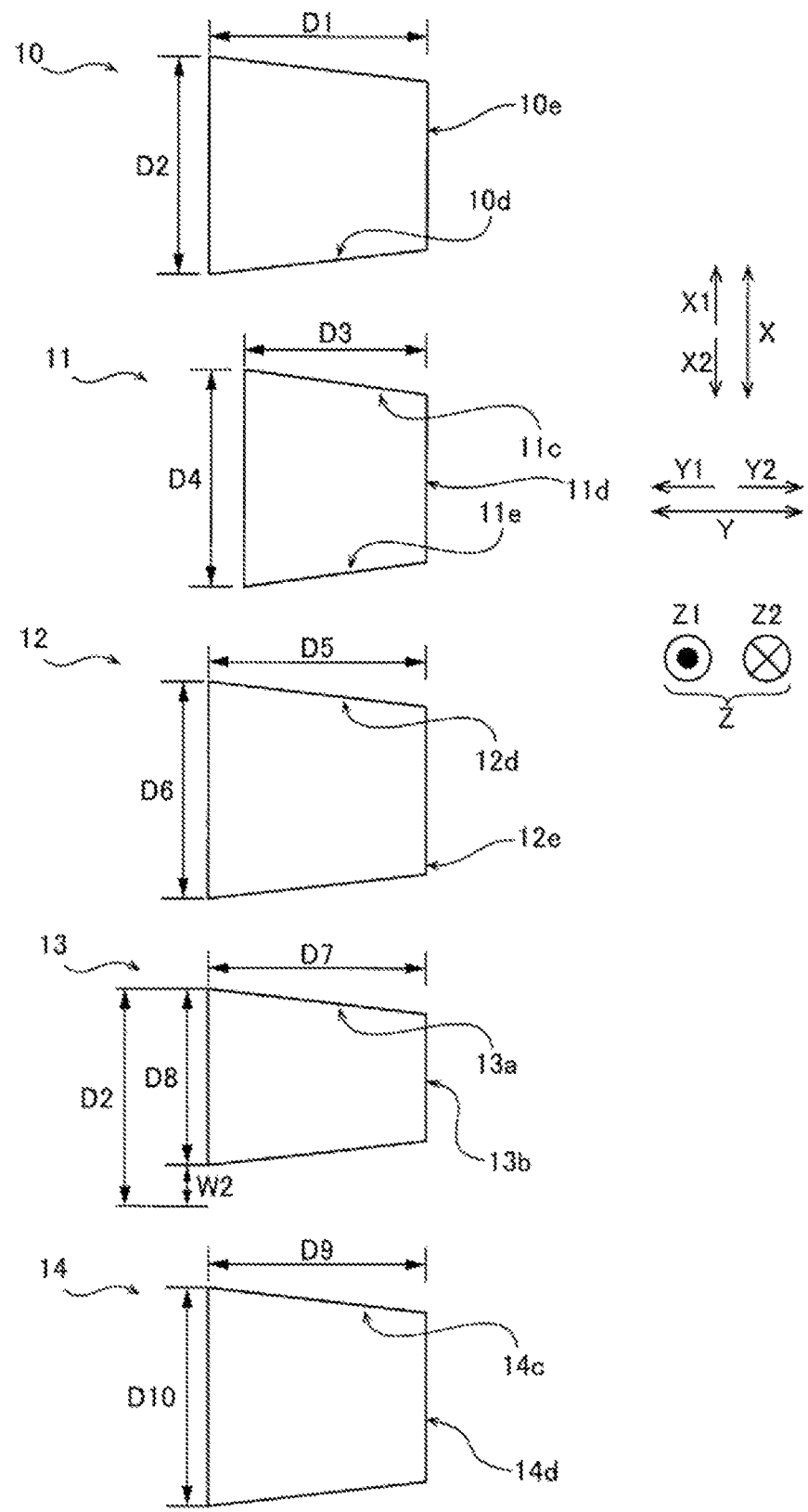
FIG. 26 is a schematic view for illustrating the size of a movable plate according to the second embodiment in a plan view.

As shown in FIG. 26, the second lower movable plate 13 has a trapezoidal shape having a long side and a short side parallel to each other in a plan view. Specifically, the second lower movable plate 13 has a side 13a extending in a direction (Y direction) orthogonal to the second lower rotation shaft 24 (see FIG. 24) in a plan view, and a side 13b extending in a direction along the second lower rotation shaft 24 (X direction). The length of the side 13a is a length D7, and the length of the side 13b is a length D8.

In addition, the third lower movable plate 14 has a trapezoidal shape having a long side and a short side parallel to each other in a plan view. Specifically, the third lower movable plate 14 has a side 14c extending in a direction (Y direction) orthogonal to the third lower rotation shaft 25 (see FIG. 24) in a plan view, and a side 14d extending in a direction along the third lower rotation shaft 25 (X direction). The length of the side 14c is a length D9, and the length of the side 14d is a length D10.

The length D7 of the side 13a and the length D9 of the side 14c are approximately equal to the length D1 of the side 10d. In addition, the length D8 of the side 13b is shorter than the length D2 of the side 10e, and the length D10 of the side 14d is substantially equal to the length D2 of the side 10e. Therefore, the upper movable plate 10 to the third lower movable plate 14 are arranged in a manner of overlapping each other in a plan view. Additionally, the second connecting member 41 is arranged on the X2 direction side of the second lower movable plate 13 and within a width W2 which is a difference between the length D2 of the upper movable plate 10 and the length D8 of the second lower movable plate 13.

It should be noted that other configurations of the second embodiment are the same as those of the first embodiment.

(Effect of Second Embodiment)

In the second embodiment, the following effects can be obtained.

In the second embodiment, as described above, the tilting device 200 further includes: the second lower movable plate 13 arranged below the first lower movable plate 12 and connected to the first lower movable plate 12 in a rotatable manner via the second lower rotation shaft 24; the third expansion/contraction bag 32 arranged between the first lower movable plate 12 and the second lower movable plate 13; the third lower movable plate 14 arranged below the second lower movable plate 13 and connected to the second lower movable plate 13 in a rotatable manner via the third lower rotation shaft 25; the fourth expansion/contraction bag 33 arranged between the second lower movable plate 13 and the third lower movable plate 14; and the second connecting member 41 that is connected to the first lower movable plate 12 in a rotatable manner via the third connecting rotation shaft 26 at the end portion 12f on one side of a direction (Y direction) orthogonal to the first direction (X direction) in a plan view, and that is connected to the third lower movable plate 14 in a rotatable manner via the fourth connecting rotation shaft 27 at the end portion 14a on the other side of the direction orthogonal to the first direction in a plan view. Accordingly, the tilting of the second lower movable plate 13 in an unintended direction can be suppressed even when the direction in which the movable plate is tilted is increased according to the number of the movable plates. Consequently, for example, the tilting of the second lower movable plate in an unintended direction can be suppressed even in a configuration in which a complicated tilting operation is performed by increasing the tilting directions of the movable plate in a front-rear direction and a left-right direction.

Besides, the other effects of the second embodiment are the same as those of the first embodiment.

[Variation Example]

The embodiment disclosed this time should be considered illustrative in all respects and not restrictive. The scope of the disclosure is indicated by the scope of claims rather than the description of the embodiments described above, and meanings equivalent to the claims and all modifications (variation examples) within the scope are included herein.

Figure 27:
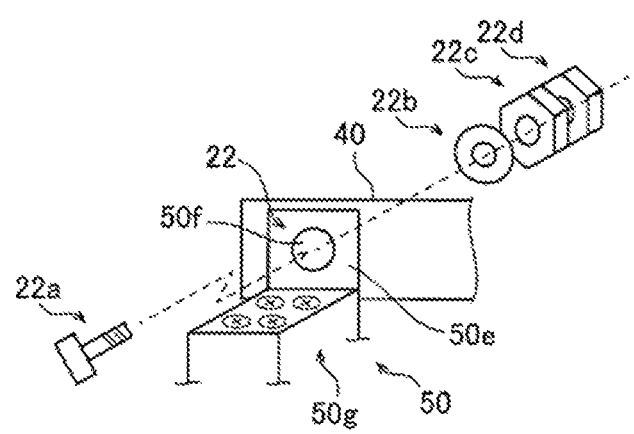
FIG. 27 is a schematic diagram for illustrating a configuration of a first connecting rotation shaft according to a variation example.

For example, in the first embodiment and the second embodiment described above, an example is shown in which the first protrusion 50 is constituted of a so-called eyebolt, but the disclosure is not limited thereto. For example, as in a variation example shown in FIG. 27, the first protrusion 50 may be formed in an L shape and constituted of a plate-shaped member 50e having a hole portion 50f, and a spacer member 50g. When the first protrusion 50 is constituted of the plate-shaped member 50e and the spacer member 50g, the pin member 22a inserted into the hole portion 50f arranged in the plate-shaped member 50e may be configured to hold the first connecting member 40 in a rotatable manner by being fixed by the washer 22b, the first nut 22c, and the second nut 22d. Note that, the second protrusion 51, the third protrusion 52, and the fourth protrusion 53 may be configured in the same manner.

In addition, in the first embodiment and the second embodiment, an example of the configuration in which the movable plate has a trapezoidal shape having a long side and a short side parallel to each other in a plan view is shown, but the disclosure is not limited thereto. For example, the movable plate may have a shape other than the trapezoidal shape in the plan view. Each movable plate may have, for example, a rectangular shape or a hexagonal shape. Additionally, each movable plate may not have sides parallel to each other.

Besides, in the first embodiment and the second embodiment, an example of the configuration in which the first connecting member 40 and the second connecting member 41 have a rod-like shape is shown, but the disclosure is not limited thereto. For example, in the disclosure, the first connecting member 40 and the second connecting member 41 may have a plate-like shape. In addition, the first connecting member 40 and the second connecting member 41 may include a sheet metal such as a steel plate, a metal bar, a sheet such as cloth, a metal wire made of steel or the like, a string made of fibers, and the like. The first connecting member 40 (the second connecting member 41) may have any shape as long as the first connecting member 40 (the second connecting member 41) is made of a material having a small elongation with respect to tensile force and is connected to the upper movable plate 10 (the first lower movable plate 12) and the first lower movable plate 12 (the third lower movable plate 14), and is capable of restricting the movement of the upper rotation shaft 20 of the upper movable plate 10 (the lower second rotation shaft 24 of the first lower movable plate 12).

In addition, in the first embodiment and the second embodiment, an example of the configuration in which the length D3 of the intermediate movable plate 11 in the third direction (Y1 direction) is smaller than the length D1 of the upper movable plate 10 in the third direction and the length D5 of the first lower movable plate 12 in the third direction is shown, but the disclosure is not limited thereto. For example, the length D3 of the intermediate movable plate 11 in the third direction (Y1 direction) may be substantially equal to the length D1 of the upper movable plate 10 in the third direction and the length D5 of the first lower movable plate 12 in the third direction. However, when the length D3 of the intermediate movable plate 11 in the third direction (Y1 direction) is substantially equal to the length D1 of the upper movable plate 10 in the third direction and the length D5 of the first lower movable plate 12 in the third direction, the position where the first connecting member 40 is arranged is on the outside (Y1 direction side) of the upper movable plate 10 and the first lower movable plate 12 in the Y direction, so that the size of the movable portion 1 becomes large. Therefore, the tilting device 100 becomes large in size. For this reason, the length D3 of the intermediate movable plate 11 in the third direction (Y1 direction) is preferably smaller than the length D1 of the upper movable plate 10 in the third direction and the length D5 of the first lower movable plate 12 in the third direction.

Besides, in the first embodiment and the second embodiment, an example of the configuration in which the pressure sensors are arranged in the flow passage 60 between the flow passage switching unit 4 and each expansion/compression bag is shown, but the disclosure is not limited thereto. For example, the pressure sensor may be arranged on an input side of the pump 5 to detect the total exhaustion of air from each expansion/contraction bag. Additionally, the pressure sensor may be arranged on the output side of the pump 5 to detect the pressure when air is supplied to each expansion/contraction bag.

In addition, in the first embodiment and the second embodiment, an example of the configuration in which the end portion 40a of the first connecting member 40 is bent at the angle β and the end portion 40b of the first connecting member 40 is bent at the angle α is shown, but the disclosure is not limited thereto. For example, the end portion 40a and the end portion 40b of the first connecting member 40 may be configured to have a predetermined angle depending on machining precision, or may be configured in a manner that the angle can be adjusted.

Besides, in the first embodiment and the second embodiment, an example is shown in which the tilting device 100 and the tilting device 200 include an angle sensor and a pressure sensor, but the disclosure is not limited thereto. In the disclosure, the tilting device may be configured to include either the angle sensor or the pressure sensor.

In addition, in the first embodiment and the second embodiment, an example is shown in which the control unit 3 and the control unit 203 perform control based on numerical values set by the operation of the operation unit 7, but the disclosure is not limited thereto. In the disclosure, for example, the control unit 3 may perform control based on a set value set in advance.

Besides, in the first embodiment, an example is shown in which the upper rotation shaft 20 and the first lower rotation shaft 21 extend along the Y direction, but the disclosure is not limited thereto. In the disclosure, the upper rotation shaft 20 and the first lower rotation shaft 21 may extend along the X direction. When the upper rotation shaft 20 and the first lower rotation shaft 21 extend along the X direction, the first connecting member 40 may be configured to extend along the Y direction.

In addition, in the first embodiment and the second embodiment, an example of the configuration in which each actuator includes an expansion/contraction bag is shown, but the disclosure is not limited thereto. In the disclosure, the actuator may include a tilting device such as a jack or the like other than the expansion/contraction bag.

Besides, in the first embodiment, for convenience of explanation, a flow-driven flowchart in which the rotation of the movable portion 1 by the control unit 3 is sequentially processed along the processing flow is used for description, but the disclosure is not limited thereto. In the disclosure, the processing operation by the control unit 3 may be performed by event-driven processing that executes processing in event units. In this case, the processing operation by the control unit 3 may be performed by a complete event-driven processing or may be performed by a combination of event-driven processing and flow-driven processing.

What is claimed is:

1. A tilting device, comprising:
   an upper movable plate arranged on a side on which an object to be tilted is arranged;
   an intermediate movable plate arranged below the upper movable plate and connected to the upper movable plate in a rotatable manner via an upper rotation shaft;

a first actuator arranged between the upper movable plate and the intermediate movable plate;

a first lower movable plate arranged below the intermediate movable plate and connected to the intermediate movable plate in a rotatable manner via a first lower rotation shaft;

a second actuator arranged between the intermediate movable plate and the first lower movable plate; and a first connecting member that is connected to the upper movable plate in a rotatable manner via a first connecting rotation shaft at an end portion on a side of a first direction opposite to an end portion at which the upper movable plate is connected to the intermediate movable plate, and that is connected to the first lower movable plate in a rotatable manner via a second connecting rotation shaft at an end portion on a side of a second direction opposite to the first direction, wherein the first connecting rotation shaft of the first connecting member and the upper movable plate is arranged substantially coaxially with the first lower rotation shaft of the intermediate movable plate and the first lower movable plate, and the second connecting rotation shaft of the first connecting member and the first lower movable plate is arranged substantially coaxially with the upper rotation shaft of the upper movable plate and the intermediate movable plate.

2. The tilting device according to claim 1, wherein the first connecting member is a rod and is configured to extend in a direction intersecting the upper rotation shaft and the first lower rotation shaft in a plan view.

3. The tilting device according to claim 1, wherein the first connecting member is arranged at an end portion of the upper movable plate and an end portion of the first lower movable plate in a third direction which is on one side of a direction orthogonal to the first direction and the second direction in a plan view.

4. The tilting device according to claim 3, wherein a length of the upper movable plate in a direction along the upper rotation shaft is larger than a length of the inteiiiiediate movable plate in a direction along the upper rotation shaft, and a length of the first lower movable plate in a direction along the first lower rotation shaft is larger than a length of the intermediate movable plate in a direction along the first lower rotation shaft, the first connecting rotation shaft is arranged on an end portion side of the upper movable plate and more outward than the first lower rotation shaft in the third direction, and the second connecting rotation shaft is arranged on an end portion side of the first lower movable plate and more outward than the upper rotation shaft in the third direction.

5. The tilting device according to claim 4, further comprising:

a first protrusion of the upper movable plate, which is arranged more outward than the first lower rotation shaft in the third direction and protrudes downward from the upper movable plate toward the first lower movable plate; and a second protrusion of the first lower movable plate, which is arranged more outward than the upper rotation shaft in the third direction and protrudes upward from the first lower movable plate toward the upper movable plate, wherein the first connecting rotation shaft is arranged at an end portion on the lower side of the first protrusion, and the second connecting rotation shaft is arranged at an end portion on the upper side of the second protrusion.

6. A tilting device, comprising:

an upper movable plate arranged on a side on which an object to be tilted is arranged;

an intermediate movable plate arranged below the upper movable plate and connected to the upper movable plate in a rotatable manner via an upper rotation shaft;

a first actuator arranged between the upper movable plate and the intermediate movable plate;

a first lower movable plate arranged below the intermediate movable plate and connected to the intermediate movable plate in a rotatable manner via a first lower rotation shaft;

a second actuator arranged between the intermediate movable plate and the first lower movable plate;

a first connecting member that is connected to the upper movable plate in a rotatable manner via a first connecting rotation shaft at an end portion on a side of a first direction opposite to an end portion at which the upper movable plate is connected to the intermediate movable plate, and that is connected to the first lower movable plate in a rotatable manner via a second connecting rotation shaft at an end portion on a side of a second direction opposite to the first direction;

a second lower movable plate arranged below the first lower movable plate and connected to the first lower movable plate in a rotatable manner via a second lower rotation shaft;

a third actuator arranged between the first lower movable plate and the second lower movable plate;

a third lower movable plate arranged below the second lower movable plate and connected to the second lower movable plate in a rotatable manner via a third lower rotation shaft;

a fourth actuator arranged between the second lower movable plate and the third lower movable plate; and a second connecting member that is connected to the first lower movable plate in a rotatable manner via a third connecting rotation shaft at an end portion on one side of a direction orthogonal to the first direction in a plan view, and that is connected to the third lower movable plate in a rotatable manner via a fourth connecting rotation shaft at an end portion on the other side of the direction orthogonal to the first direction in the plan view.

7. A tilting device, comprising:

an upper movable plate arranged on a side on which an object to be tilted is arranged;

an intermediate movable plate arranged below the upper movable plate and connected to the upper movable plate in a rotatable manner via an upper rotation shaft;

a first actuator arranged between the upper movable plate and the intermediate movable plate;

a first lower movable plate arranged below the inteiiiiediate movable plate and connected to the intermediate movable plate in a rotatable manner via a first lower rotation shaft;

a second actuator arranged between the intermediate movable plate and the first lower movable plate; and a first connecting member that is connected to the upper movable plate in a rotatable manner via a first connecting rotation shaft at an end portion on a side of a first direction opposite to an end portion at which the upper movable plate is connected to the intermediate movable plate, and that is connected to the first lower movable plate in a rotatable manner via a second connecting rotation shaft at an end portion on a side of a second direction opposite to the first direction, wherein the first actuator comprises a first expansion/contraction bag capable of expanding and contracting by supply and exhaustion of gas, the second actuator comprises a second expansion/contraction bag capable of expanding and contracting by supply and exhaustion of gas, and the tilting device further comprises a control unit that controls adjustment of a tilt angle of the upper movable plate by controlling supply/exhaustion of gas to/from the first expansion/contraction bag and the second expansion/contraction bag.

8. The tilting device according to claim 7, further comprising:
a flow passage for supplying/exhausting gas to/from the first expansion/contraction bag and the second expansion/contraction bag;
a flow passage switching unit for switching the flow passage; and
a pump for supplying/exhausting gas to/from the first expansion/contraction bag and the second expansion/contraction bag,
wherein the control unit is configured to control the supply/exhaustion of gas to/from the first expansion/contraction bag and the second expansion/contraction bag by controlling the flow passage switching unit and the pump.

9. The tilting device according to claim 7, further comprising an angle sensor for measuring the tilt angle at which the upper movable plate is tilted,
wherein the control unit is configured to perform control in a manner to stop the supply or exhaust of gas to and from the first expansion/contraction bag and the second expansion/contraction bag when the tilt angle measured by the angle sensor becomes a predeteiiiiined angle.

10. The tilting device according to claim 7, further comprising:
a first pressure sensor that measures pressure inside the first expansion/contraction bag; and
a second pressure sensor that measures pressure inside the second expansion/contraction bag,
wherein the control unit is configured to perfoi in control in a manner to stop a gas supply to the first expansion/contraction bag when the pressure inside the first expansion/contraction bag measured by the first pressure sensor exceeds a predetermined first upper limit value, and stop the gas supply to the second expansion/contraction bag when the pressure inside the second expansion/contraction bag measured by the second pressure sensor exceeds a predetermined second upper limit value.

* * * * *